United States Patent
Chopra et al.

(10) Patent No.: US 11,475,061 B2
(45) Date of Patent: Oct. 18, 2022

(54) METHOD AND DEVICE FOR DETECTING DUPLICATE CONTENT

(71) Applicant: Samsung Electronics Co., Ltd., Suwon-si (KR)

(72) Inventors: Ashish Chopra, Haryana (IN); Rajan Dahiya, Haryana (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/273,151

(22) PCT Filed: Sep. 11, 2019

(86) PCT No.: PCT/KR2019/011790
§ 371 (c)(1),
(2) Date: Mar. 3, 2021

(87) PCT Pub. No.: WO2020/055141
PCT Pub. Date: Mar. 19, 2020

(65) Prior Publication Data
US 2021/0326379 A1  Oct. 21, 2021

(30) Foreign Application Priority Data
Sep. 12, 2018  (IN) .............................. 201841034356

(51) Int. Cl.
*G06F 16/00* (2019.01)
*G06F 7/00* (2006.01)
(Continued)

(52) U.S. Cl.
CPC ........ *G06F 16/683* (2019.01); *G06F 16/1752* (2019.01)

(58) Field of Classification Search
CPC ........................... G06F 16/683; G06F 16/1752
(Continued)

(56) References Cited

U.S. PATENT DOCUMENTS

| 6,563,440 | B1 * | 5/2003 | Kangas | H03M 7/42 |
| | | | | 341/65 |
| 7,043,473 | B1 * | 5/2006 | Rassool | G06F 16/683 |

(Continued)

FOREIGN PATENT DOCUMENTS

| CN | 102411971 | 4/2012 |
| CN | 102929991 | 2/2013 |

(Continued)

OTHER PUBLICATIONS

Examination Report for IN Application No. 201841034356 dated Nov. 20, 2020, 6 pages with English Translation.

(Continued)

*Primary Examiner* — Raquel Perez-Arroyo
(74) *Attorney, Agent, or Firm* — Nixon & Vanderhye, P.C.

(57) ABSTRACT

Provided is a method for detecting duplicate audio content in an electronic device. The method includes receiving, by the electronic device, a plurality of audio content, decoding, by the electronic device, each of the audio content to extract a plurality of byte streams of each of the audio content and audio feature information, generating, by the electronic device, a unique signature for each of the audio content based on the plurality of byte streams of each of the audio content, and storing, by the electronic device, the unique signature of each of the audio content in the electronic device to identify duplicate audio content.

12 Claims, 22 Drawing Sheets

(51) Int. Cl.
*G06F 16/683* (2019.01)
*G06F 16/174* (2019.01)

(58) Field of Classification Search
USPC .......................................................... 707/692
See application file for complete search history.

(56) References Cited

U.S. PATENT DOCUMENTS

| | | |
|---|---|---|
| 7,421,305 B2 | 9/2008 | Burges et al. |
| 8,214,517 B2 | 7/2012 | Dubnicki et al. |
| 8,587,668 B2 | 11/2013 | Haritaoglu |
| 8,611,422 B1 | 12/2013 | Yagnik et al. |
| 8,799,236 B1 | 8/2014 | Azari et al. |
| 9,275,427 B1 | 3/2016 | Sharifi |
| 9,491,517 B2 | 11/2016 | Trollope et al. |
| 2004/0093202 A1 | 5/2004 | Fischer et al. |
| 2009/0171990 A1 | 7/2009 | Naef, III |
| 2009/0171999 A1 | 7/2009 | McColl et al. |
| 2010/0037059 A1* | 2/2010 | Sun ........................ G06T 1/005 713/176 |
| 2010/0161562 A1 | 6/2010 | Karajagi |
| 2011/0122255 A1 | 5/2011 | Haritaoglu |
| 2014/0223029 A1 | 8/2014 | Bhaskar et al. |
| 2016/0156731 A1* | 6/2016 | Wang .................... H04L 65/601 709/217 |

FOREIGN PATENT DOCUMENTS

| | | |
|---|---|---|
| EP | 2 323 046 | 5/2011 |
| KR | 10-2009-0085157 | 8/2009 |

OTHER PUBLICATIONS

International Search Report for PCT/KR2019/011790 dated Dec. 24, 2019, 4 pages.
Written Opinion of the ISA for PCT/KR2019/011790 dated Dec. 24, 2019, 6 pages.

* cited by examiner

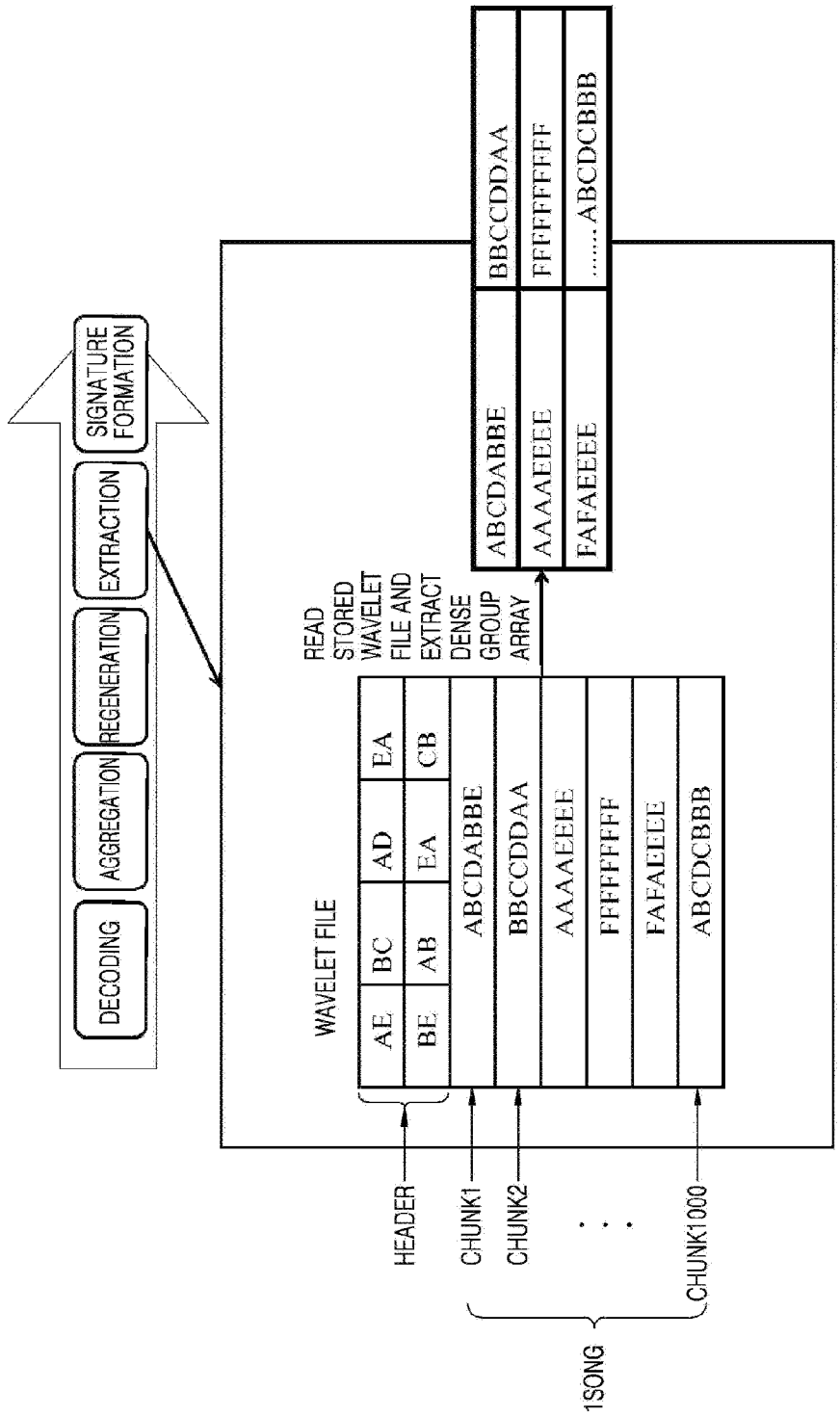

METHOD AND DEVICE FOR DETECTING DUPLICATE CONTENT

This application is the U.S. national phase of International Application No. PCT/KR2019/011790 filed Sep. 11, 2019 which designated the U.S. and claims priority to IN Patent Application No. 201841034356 filed Sep. 12, 2018, the entire contents of each of which are hereby incorporated by reference.

TECHNICAL FIELD

The disclosure relates to a method and an apparatus for memory optimization. In particular, the disclosure relates to detecting duplicate content for memory optimization.

BACKGROUND ART

Electronic devices, including, but not limited to, smartphones, tablets, personal computers, can store a variety of multimedia applications and content. Large libraries or playlists of audio content can also be stored. The above information is presented as background information only to help the reader to understand the present invention. Applicants have made no determination and make no assertion as to whether any of the above might be applicable as Prior Art with regard to the present application.

SUMMARY

Various duplicate audio contents from different sources can be stored. Duplicate audio contents have different filenames and tags but are have the same content. Accordingly, the duplicate audio content is redundant. Moreover, redundant data may be gathered in the device through social networking services or through various networks. Memories in the electronic device may be unprotected against duplicate audio content if a mechanism to detect and remove the duplicate audio content is implemented.

There remains a need for a robust mechanism that can detect duplicate audio content and optimize memory storage in the electronic device.

Provided is a method of detecting duplicate content in an electronic device, the method comprising detecting content from at least one content source; decoding the content to generate a plurality of byte streams and extract feature information from the content; generating a densest group array corresponding to each of the plurality of byte streams by reducing a size of the each of the plurality of byte streams; generating a unique signature for the content based on the densest group array corresponding to each of the plurality of byte streams; and detecting duplicate audio content based on a matching unique signature by comparing the unique signature with unique signatures corresponding to other contents stored in the electronic device.

The disclosure enables an electronic device to identify and remove duplicate content stored in the electronic device and to optimize the management of memory included in the electronic device.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 7A and 7B are diagrams illustrating the extraction phase, according to an embodiment of the disclosure;

Throughout the drawings, like reference numerals will be understood to refer to like parts, components, and structures.

DETAILED DESCRIPTION OF EXAMPLE EMBODIMENTS

Figure 1:
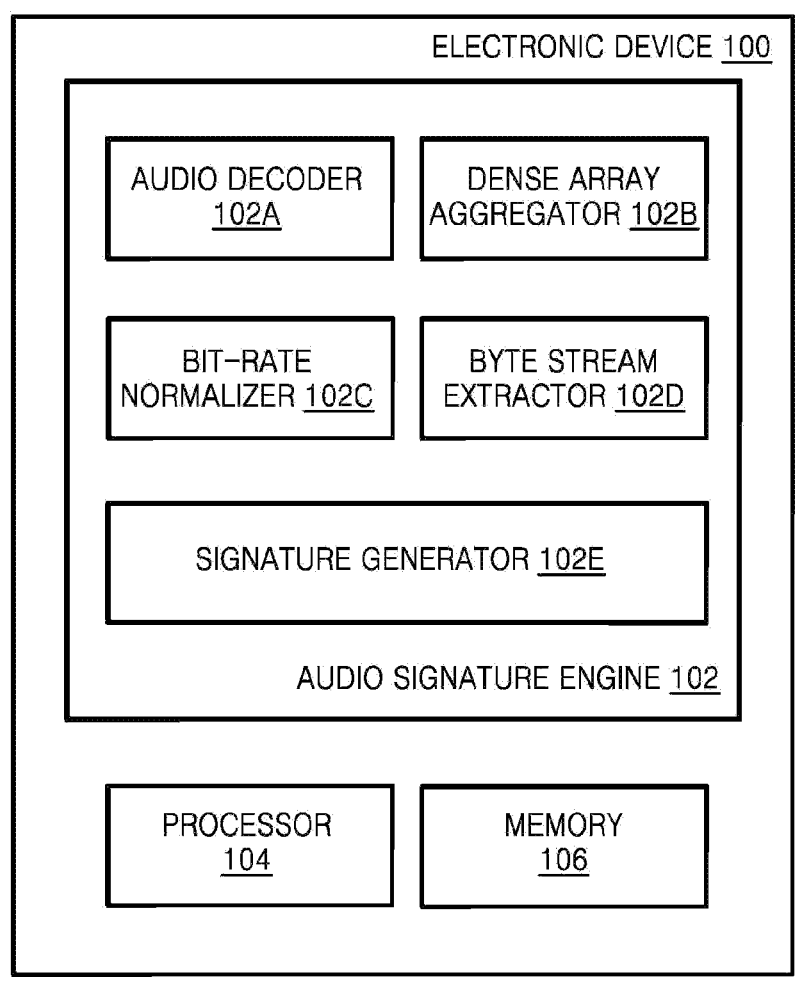
FIG. 1 is a block diagram illustrating an electronic device for detecting audio content, according to an embodiment of the disclosure.

Provided is a method of detecting duplicate content in an electronic device, the method comprising detecting content from at least one content source; decoding the content to generate a plurality of byte streams and extract feature information from the content; generating a densest group array corresponding to each of the plurality of byte streams by reducing a size of the each of the plurality of byte streams; generating a unique signature for the content based on the densest group array corresponding to each of the plurality of byte streams; and detecting duplicate audio content based on a matching unique signature by comparing the unique signature with unique signatures corresponding to other contents stored in the electronic device.

In an embodiment, the method further comprises deleting the duplicate audio content from the electronic device.

In an embodiment, the content is at least one of audio content, video content, image content, and text content.

In an embodiment, the generating of the densest group array corresponding to the each of the plurality of byte streams comprises determining a size of sliding window covering a number of bits consecutively in the each of the plurality of byte streams; detecting a sliding window with maximum number of bits having a value of 1 consecutively for the each of the plurality of byte streams, respectively; aggregating the sliding window with the maximum number of bits having a value of 1 consecutively for the each of the plurality of byte streams; and generating the densest group array corresponding to the each of the plurality of byte streams based on the aggregation.

In an embodiment, the method further comprises generating a data file by combining the densest group array corresponding to the each of the plurality of byte streams and a header comprising the feature information.

In an embodiment, the generating of the unique signature for the content comprises obtaining the unique signature by calculating a predetermined signature function with values of the densest group array.

In an embodiment, the feature information comprises at least one of a data size of the content, a sample rate of the content, a channel count of the content, content format, duration for reproducing the content, a bit rate of the content and a bit depth of the content.

In an embodiment, the detecting of the content from the at least one content source comprises detecting the content received from network, wherein the at least one content source is at least one node connected to the network outside the electronic device.

In an embodiment, the method further comprises shifting the sliding window from the most significant bit to the least significant bit of the each of the plurality of byte streams for detecting the sliding window with the maximum number of bits having a value of 1 consecutively for the each of the plurality of byte streams.

In an embodiment, the method further comprises performing a down-sampling or an up-sample of the other contents to match a sampling rate between the detected content and the other contents before comparing the unique signature with unique signatures corresponding to the other contents stored in the electronic device.

Provided is an apparatus for detecting duplicate content, the apparatus comprising a memory; and a processor configured to detect content from at least one content source, decode the content to generate a plurality of byte streams and extract feature information from the content, generate a densest group array corresponding to each of the plurality of byte streams by reducing a size of the each of the plurality of byte streams, generate a unique signature for the content based on the densest group array corresponding to each of the plurality of byte streams, and detect duplicate audio content based on a matching unique signature by comparing the unique signature with unique signatures corresponding to other contents stored in the memory.

In an embodiment, the generating of the densest group array corresponding to the each of the plurality of byte streams comprises determining a size of sliding window covering a number of bits consecutively in the each of the plurality of byte streams; detecting a sliding window with maximum number of bits having a value of 1 consecutively for the each of the plurality of byte streams, respectively; aggregating the sliding window with the maximum number of bits having a value of 1 consecutively for the each of the plurality of byte streams; and generating the densest group array corresponding to the each of the plurality of byte streams based on the aggregation.

In an embodiment, the generating of the unique signature for the content comprises obtaining the unique signature by calculating a predetermined signature function with values of the densest group array.

In an embodiment, the processor is configured to shift the sliding window from the most significant bit to the least significant bit of the each of the plurality of byte streams for detecting the sliding window with the maximum number of bits having a value of 1 consecutively for the each of the plurality of byte streams.

Provided is a non-transitory computer readable medium configured to store one or more computer programs including instructions that, when executed by at least one processor, cause the at least one processor to control for detecting content from at least one content source; decoding the content to generate a plurality of byte streams and extract feature information from the content; generating a densest group array corresponding to each of the plurality of byte streams by reducing a size of the each of the plurality of byte streams; generating a unique signature for the content based on the densest group array corresponding to each of the plurality of byte streams; and detecting duplicate audio content based on a matching unique signature by comparing the unique signature with unique signatures corresponding to other contents stored in the electronic device.

Mode for the Invention

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "1st" or "first" and "2nd" or "second" may use corresponding components regardless of importance or order and are used to distinguish one component from another without limiting the components.

As is traditional in the field, embodiments may be described and illustrated in terms of blocks which carry out a described function or functions. These blocks, which may be referred to herein as managers, engines, controllers, units or modules or the like, are physically implemented by analog and/or digital circuits such as logic gates, integrated circuits, microprocessors, micro-controllers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Embodiments disclosed herein provide a method for detecting duplicate audio content in an electronic device. The method includes receiving, by the electronic device, a plurality of audio content. The method further includes decoding, by the electronic device, each of the audio content to extract a plurality of byte streams of each of the audio content and audio feature information of each of the audio content. The method further includes dynamically creating, by the electronic device, a unique signature for each of the audio content based on the plurality of byte streams of each of the audio content, and storing, by the electronic device, the unique signature of each of the audio content in the electronic device to identify duplicate audio content.

The embodiments disclosed herein can be implemented through at least one software program running on at least one hardware device and performing network management functions to control the elements. The elements shown in FIGS. 1-18 include blocks which can be at least one of a hardware device, or a combination of hardware device and software module.

FIG. 1 is a block diagram of an electronic device 100 with for detection of duplicate audio content, according to an embodiment of the disclosure.

Referring to FIG. 1, the electronic device 100 includes an audio signature engine 102 communicatively coupled to a processor 104 and a memory 106. The audio signature engine 102 includes an audio decoder 102A, a dense array aggregator 102B, a bit-rate normalizer 102C, a byte stream extractor 102D, and a signature generator 102E.

The Audio Signature Engine 102 and the processor 104 may be implemented as one hardware processor.

In an embodiment, the electronic device 100 may include communication units pertaining to communication with remote computers, servers or remote databases over a communication network. The communication network may include a data network such as, but not restricted to, the Internet, local area network (LAN), wide area network (WAN), metropolitan area network (MAN) etc. In an embodiment, the communication network may include a wireless network, such as, but not restricted to, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS) etc.

The processor 104 may be, but not restricted to, a Central Processing Unit (CPU), a microprocessor, or a micro-controller. The processor 104 may execute sets of instructions stored in the memory 106.

The memory 106 may include storage locations to be addressable through the processor 104. The memory 106 may include, but not limited to, a volatile memory and/or a non-volatile memory. Further, the memory 106 may include one or more computer-readable storage media. The memory 106 may also include non-volatile storage elements. For example, non-volatile storage elements may include magnetic hard discs, optical discs, floppy discs, flash memories, or forms of electrically programmable memories (EPROM) or electrically erasable and programmable (EEPROM) memories.

In some embodiments, the memory 106 may coupled to a signature database. The signature database can be but not limited to a relational database, a navigational database, a cloud database, an in-memory database, a distributed database and the like. In some embodiments, the signature database can be stored on the memory 106. In some other embodiments, the signature database is stored on a remote computer, a server, a network of computers or the Internet.

In an embodiment, the audio signature engine 102 may generate unique signatures, each of which corresponds to an audio content stored in the memory 106 or to candidate audio content received by the electronic device 100. The unique signatures can be stored in the signature database that is coupled to the memory 106. In some embodiments, the generated unique signatures can be stored in the memory 106.

Figure 2:
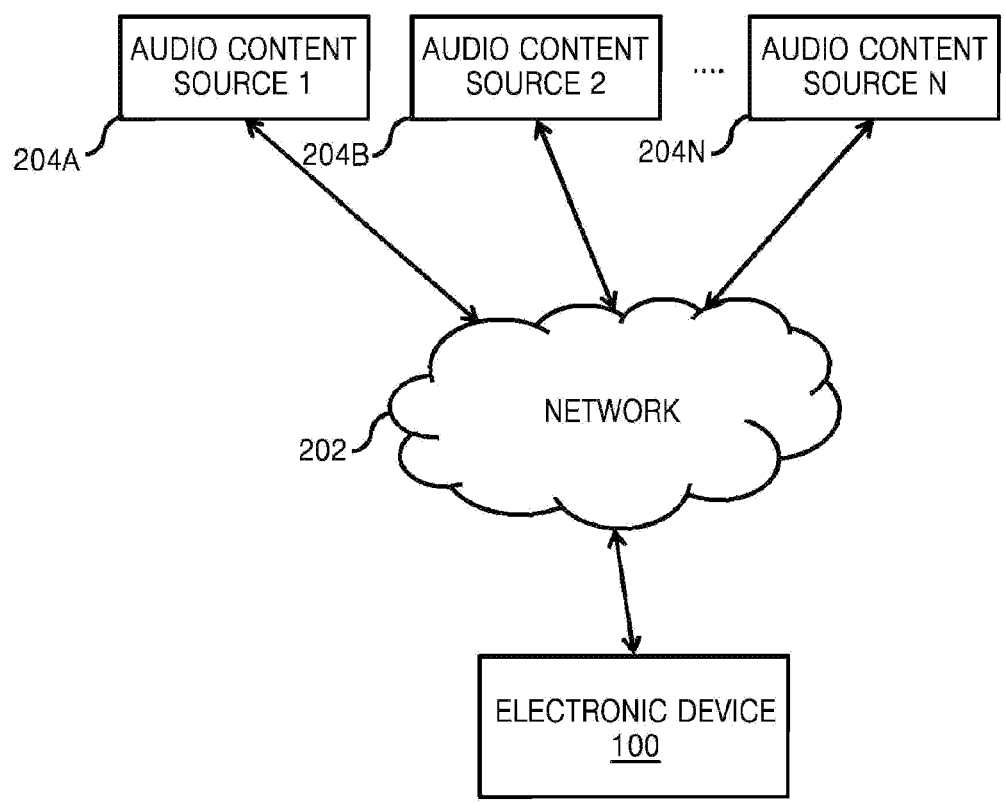
FIG. 2 illustrates the electronic device receiving audio content from various audio content sources, according to an embodiment of the disclosure.

FIG. 2 illustrates the electronic device 100 receiving audio content from various audio content sources, according to an embodiment of the disclosure.

Referring to FIG. 2, various audio content sources 204A, 204B to 204N connected to a network 202 are shown. The audio content sources 204A to 204N can be any multimodal source such as social media servers, remote peer-to-peer nodes, remote computers, cloud services, and the like. The network 202 can include a data network such as, but not limited to, an Internet, a local area network (LAN), a wide area network (WAN), a metropolitan area network (MAN), a Bluetooth, Direct Connection, etc. In certain embodiments, the communication network can include a wireless network, such as, but not restricted to, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS) etc.

Figure 3:
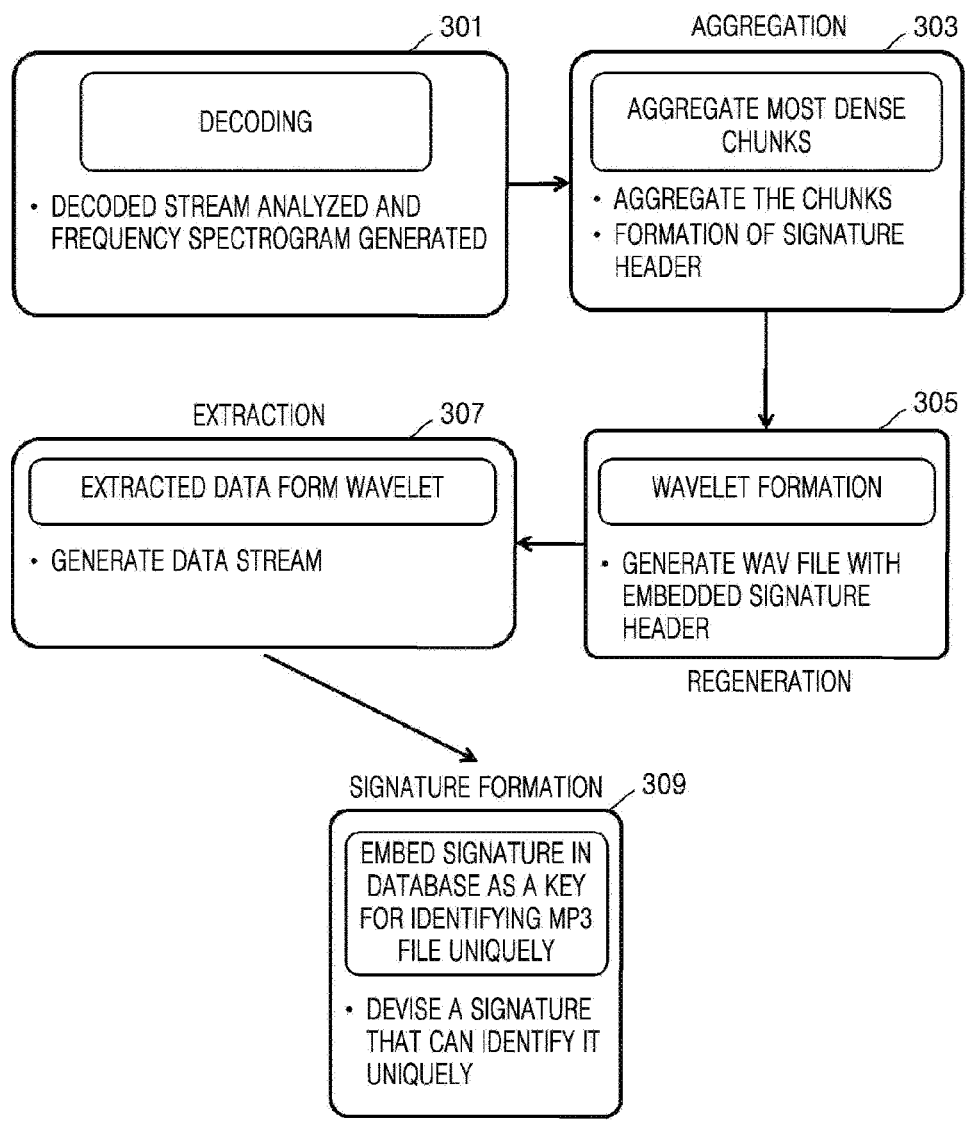
FIG. 3 is a flow diagram illustrating phases in big data analysis of audio content to detect duplicate audio content, according to an embodiment of the disclosure.

FIG. 3 is a flow diagram illustrating phases in big data analysis of audio content to detect duplicate audio content, according to an embodiment of the disclosure.

The big data analysis may be performed for the audio content or candidate audio content for detecting the duplicate audio content. In operation 301, phase 1 includes decoding audio content by the audio decoder 102A of the electronic device 100. Decoding involves processing an input stream of an audio content to obtain multiple byte streams. Decoded arrays are used for content analysis and act as an input feed to a mechanism that eventually generates a unique signature for the audio content.

In operation 303, phase 2 involves obtaining the most dominating sets of data chunks used to identify duplicate content among various contents.

In operation 305, phase 3 includes a normalization of all similar audio content to a particular signature. Similar audio content is scaled to a predefined bit-rate and stored as a wavelet file embedded with audio feature information obtained during the phase 1. The audio feature information of the audio content includes at least one of a sample rate of the audio content, a data size of the content, a channel count of the audio content, duration for reproducing the candidate audio content, a bit rate of the audio content, and/or a bit depth of the audio content.

In operation 307, phase 4 includes an extraction of byte streams from the stored wavelet file.

In operation 309, phase 5 includes unique signature formation and storing the unique signature in the signature database coupled to the memory 106. While forming and storing the unique signature, a polynomial function may be used.

Figure 4:
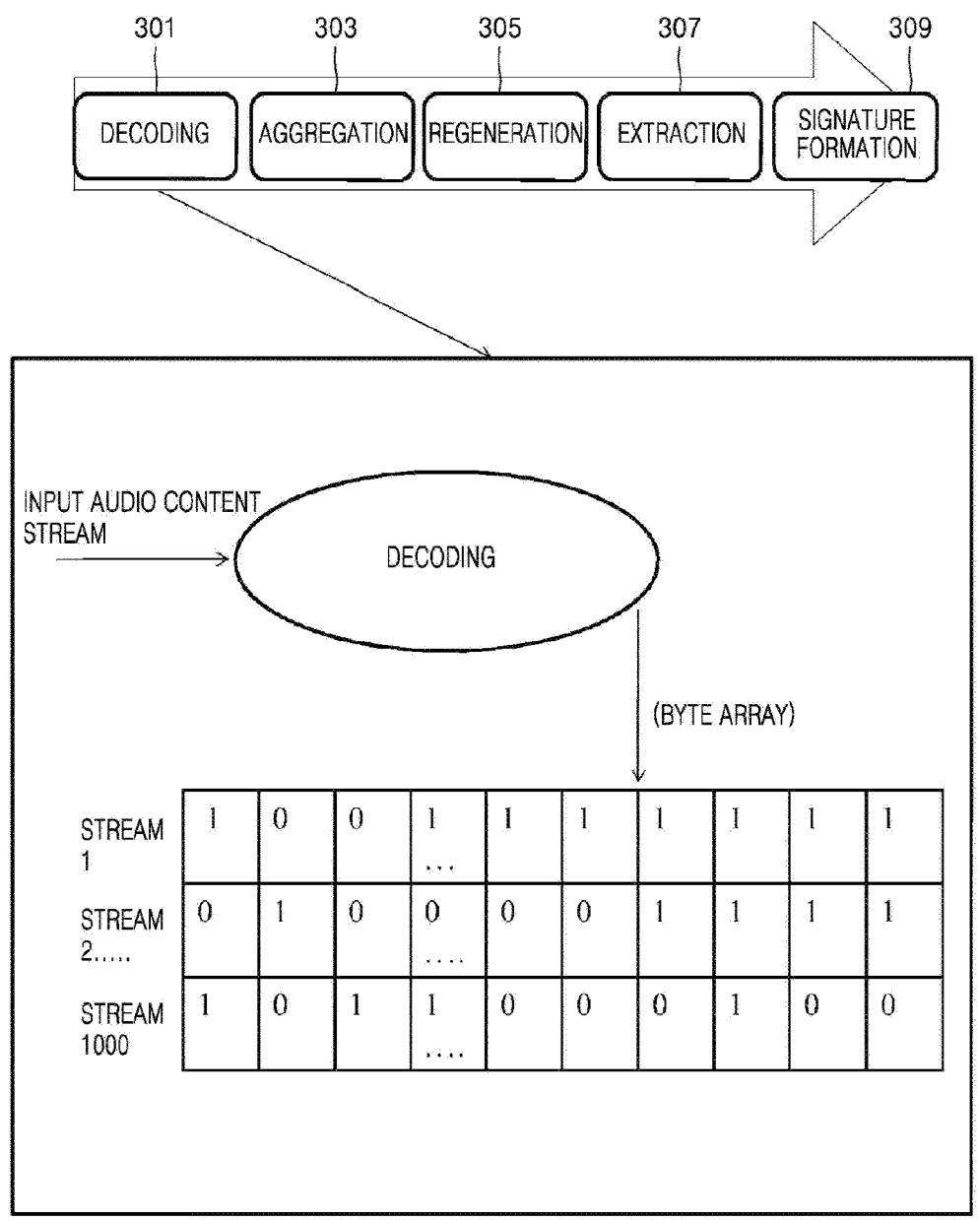
FIG. 4 is a flow diagram illustrating the decoding phase, according to an embodiment of the disclosure.

FIG. 4 is a diagram illustrating the decoding phase, according to an embodiment of the disclosure. Referring to FIG. 4, an input stream of an audio content or a candidate audio content received by the electronic device 100 is decoded by the audio decoder 102A to obtain a plurality of byte streams. In FIG. 4, 'n' byte streams are extracted during the decoding.

Figure 5A:
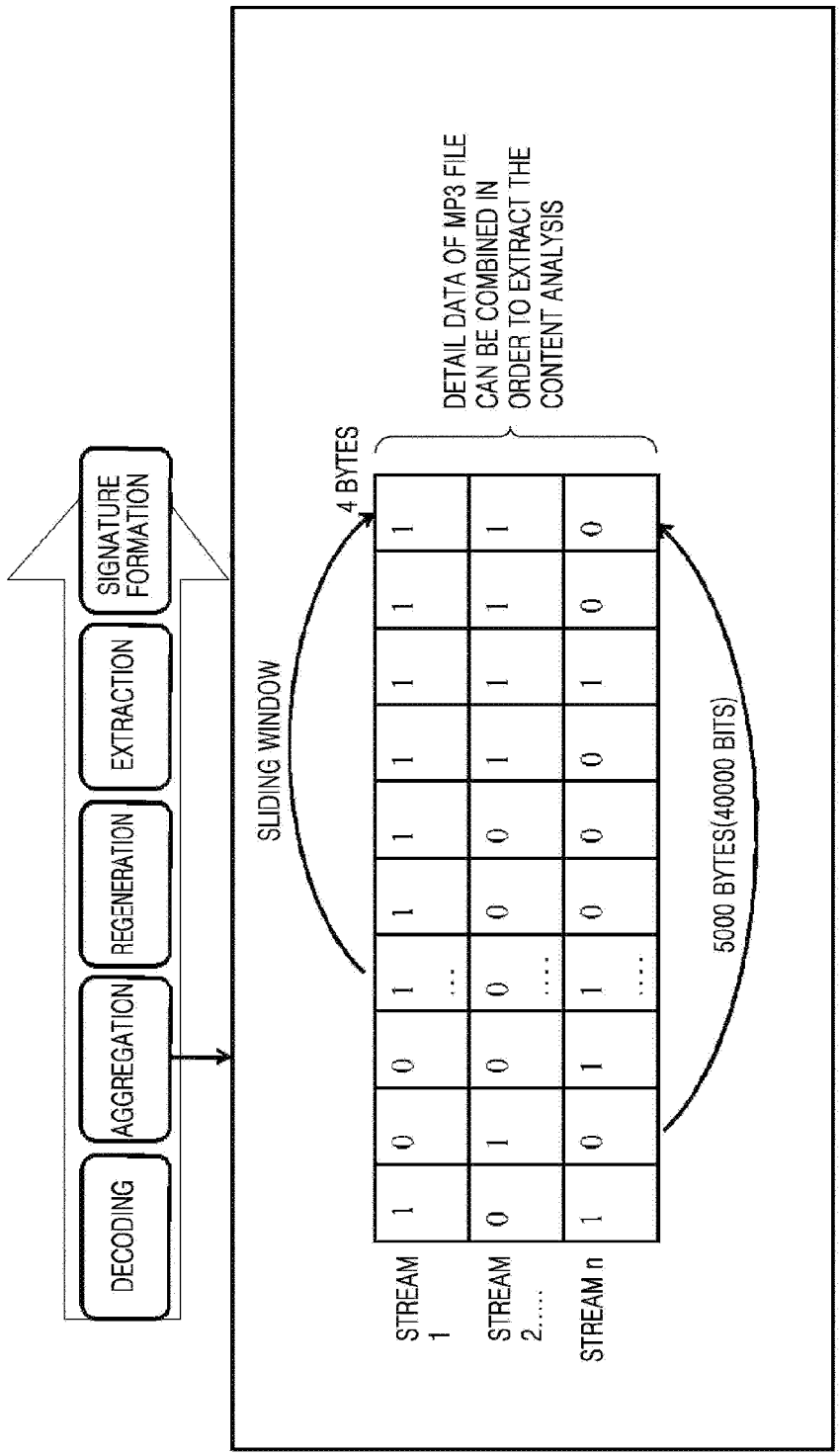
FIG. 5A and FIG. 5B are flow diagrams illustrating the aggregation phase, according to an embodiment of the disclosure.
Figure 5B:
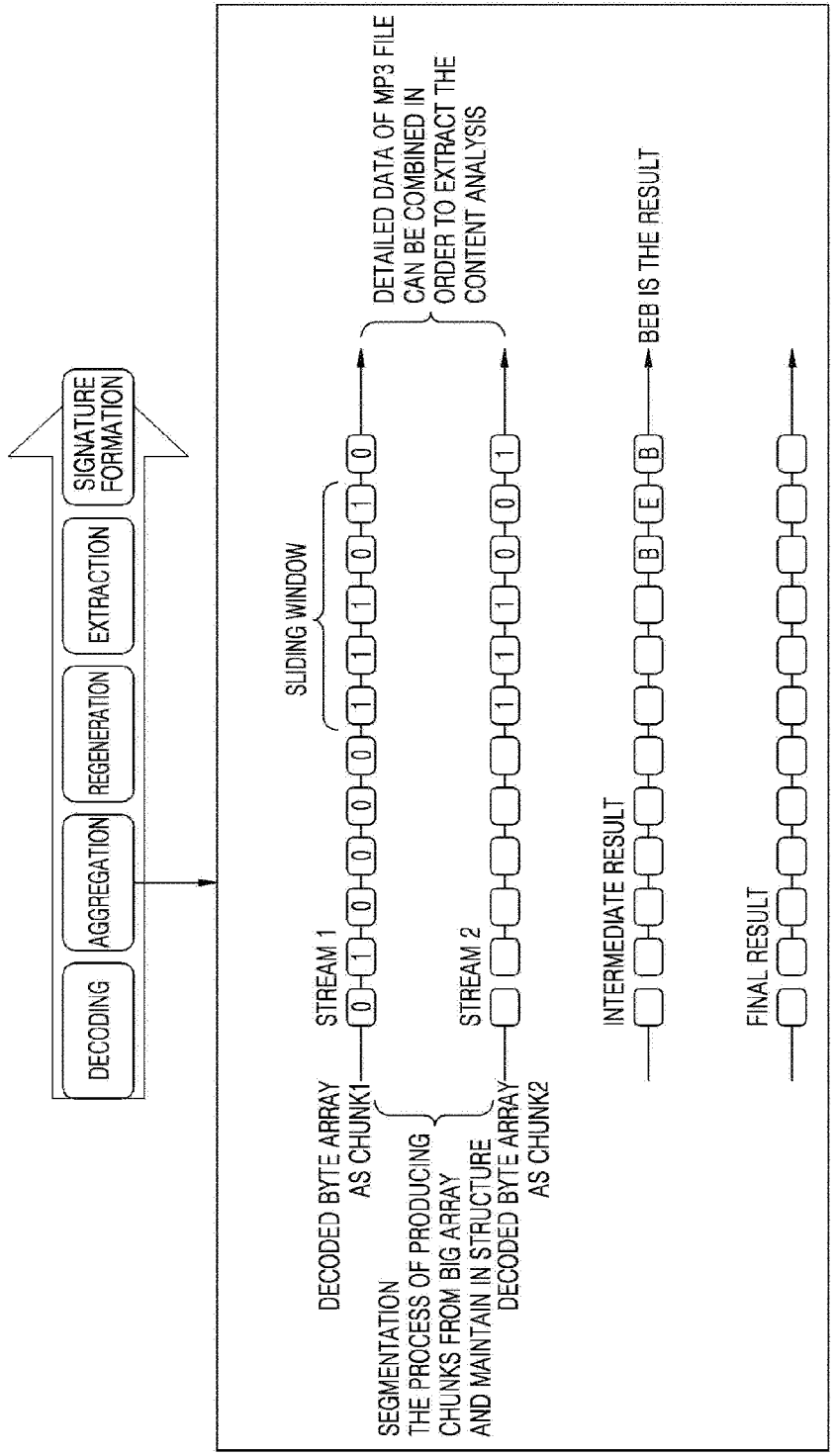

FIG. 5A and FIG. 5B are diagrams illustrating the aggregation phase, according to an embodiment of the disclosure.

Referring to FIG. 5A, in an embodiment, for one song decoded into byte streams 1, 2, . . . , n (for example, n=1,000) of data (chunks) and one byte stream has a size of 5,000 bytes (40,000 bits), the aggregation phase is used to obtain the most dominating data chunk in each byte stream and all of the most dominating data chunks are aggregated. This process is performed by using the sliding windows. In an embodiment, suppose a 3 bit-size sliding window is used where the maximum value may be consecutive bits of 111. That is to say, if 111 of consecutive bits exist inside the 3 bit-size sliding window in a byte stream, 111 is the sliding window with the maximum value or the maximum sliding window. If a sliding window having consecutive bits of 111 is unavailable, the next highest 3 bit data chunk is taken to be the maximum value such as '110,' '011,' '101', etc.

In another example, for one song has the size of 5 megabytes (MBytes), a sliding window with consecutive 32 bits may be preferred. Consecutive 32 bits (a sliding window) having '1' such as 32 number of 111 . . . 111 is selected as the densest group array for byte stream 1. Similarly, a byte stream with 32 bits having 1110 . . . 1111—only one '0' among the consecutive 32 bits is selected as the densest group array for byte stream 2. The densest group array for byte stream 3, 4, . . . , n may be obtained in the same manner.

By way of obtaining the densest group array for each of the byte stream, data of 5,000 bytes may be reduced to 32 bits (4 byte). The densest sliding windows for each of the stream may be 4 byte and as a result, all of the densest sliding window may be 4K byte for 1,000 byte streams. That is, 1,000 hexadecimal code may be obtained. In other words, from all streams of a song—one content, an aggregated dense group array is obtained by concatenating each of the densest sliding windows corresponding to each byte stream and the aggregated dense group array may have 1000 hexadecimal digits because the song has 1000 streams and each of the stream may be represented by 1000*32 bits, 4*1000 bytes or 1,000 hexadecimal digits of a dense group.

Referring to FIG. 5B, 1,000 hexadecimal code is the final value of the aggregated dense group array. I.e., the aggregated dense group array is 4 kilobytes (KB). Since the data size of 4 KB instead of 5 MB is used for uniquely identifying the content, it is possible to achieve efficient memory management and fast rate content identification.

Figure 6A:
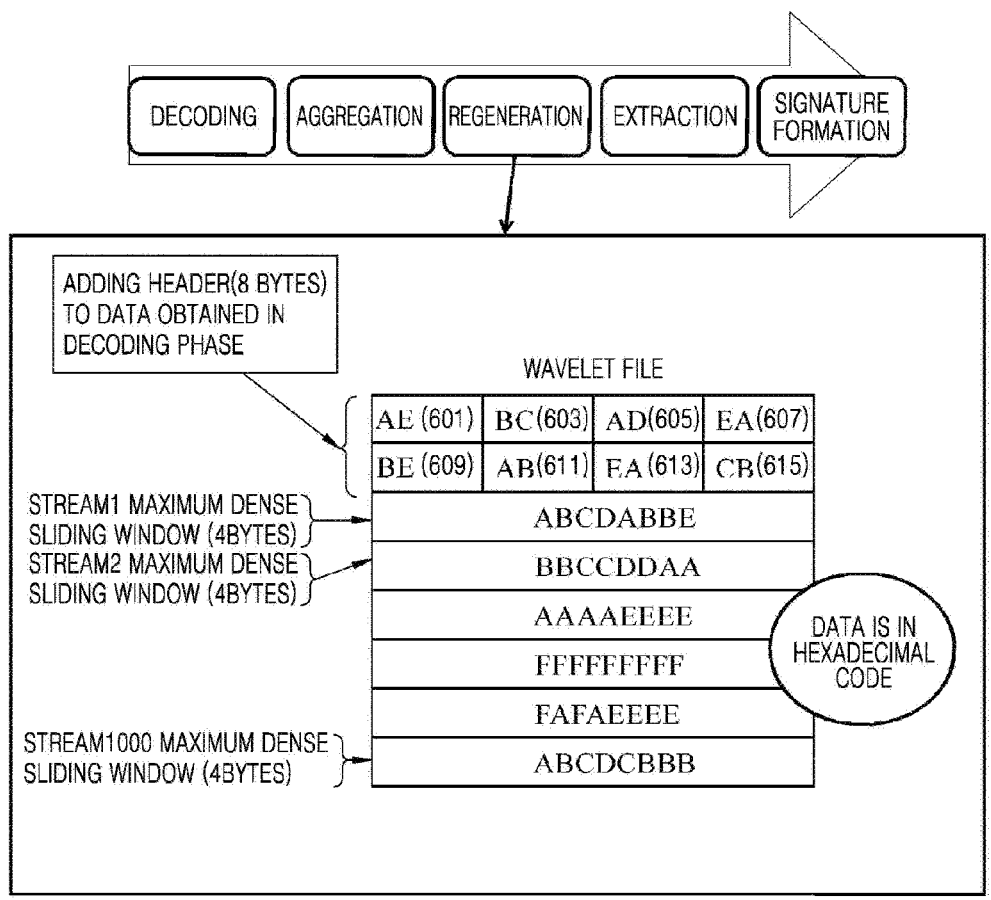
FIG. 6A and FIG. 6B are flow diagrams illustrating the regeneration phase, according to an embodiment of the disclosure.
Figure 6B:
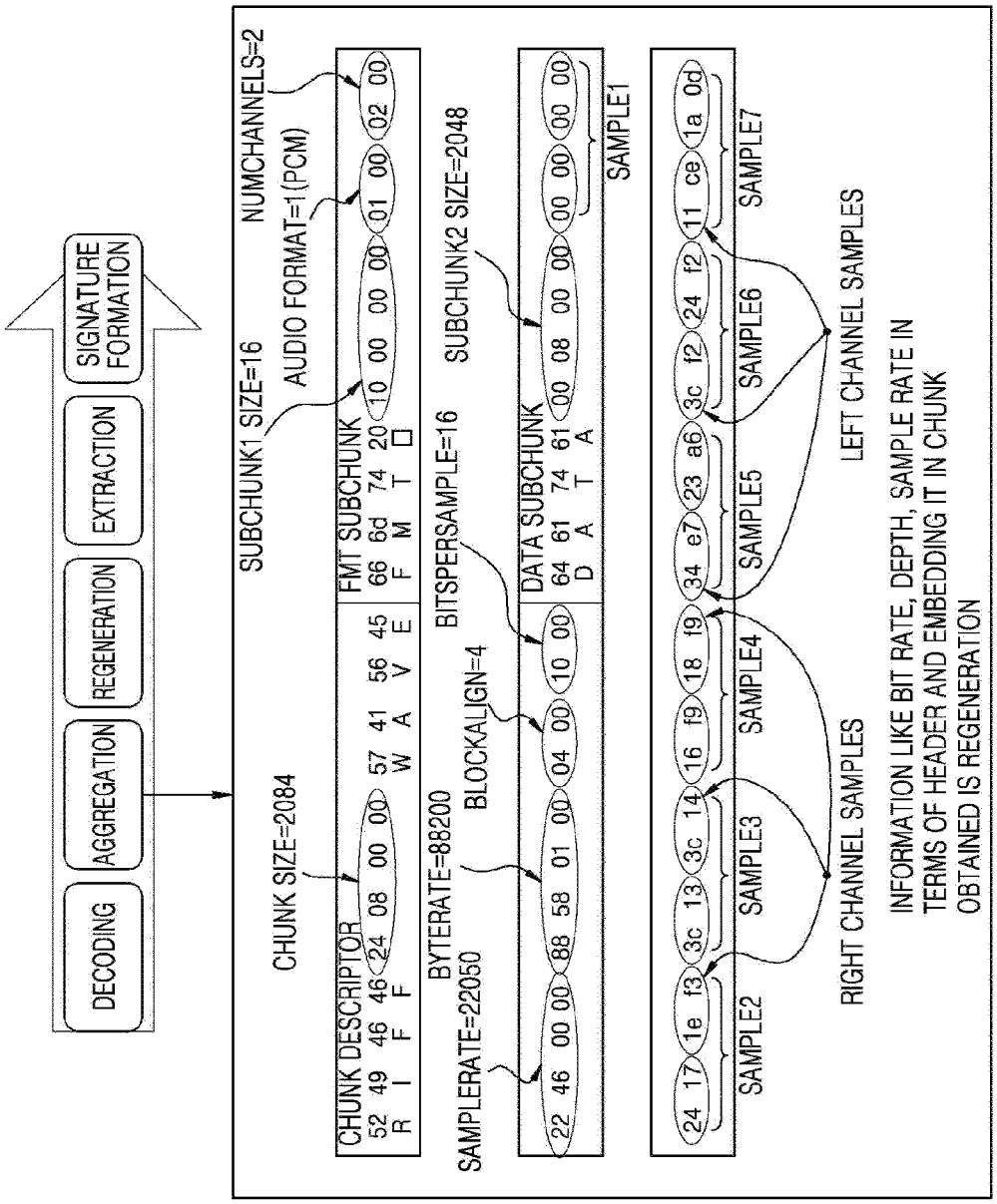

FIG. 6A and FIG. 6B are diagrams illustrating the regeneration phase, according to an embodiment of the disclosure.

The 4K Bytes size of hexadecimal coded data obtained at the aggregation phase may be up-sampled or down-sampled depending on the bit rate of the audio content fetched during the decoding phase. For example, if the normalized sampling rate is determined as 192 Kbs, lower bit rate with 48 Kbs may be up-sampled to 192 Kbs and higher bit rate with 320 Kbs may be down-sampled to 192 Kbs.

Referring to FIG. 5A, each of byte streams 1, 2, . . . , 1000 has 4 bytes of the densest group array, respectively, generated based on the aggregation phase. The total of 4K Bytes including 1000 number of 4 bytes of the densest group array will be combined with 8 bytes size of header to generate a wavelet file. The 8 bytes of header may include the audio feature information fetched during the decoding phase. The audio feature information is embedded as a header of the wavelet file, as shown in FIG. 6A and FIG. 6B.

In an embodiment, each of one byte among the header may represent information of chunk size 601, sub-chunk size 603, audio format 605, channels 607, a sample rate 609, a byte rate 611, bits per sample 613, and a block align 614 of the audio content. The final wavelet file including the header may have a size of 4 KB+8 bytes.

Figure 7B:
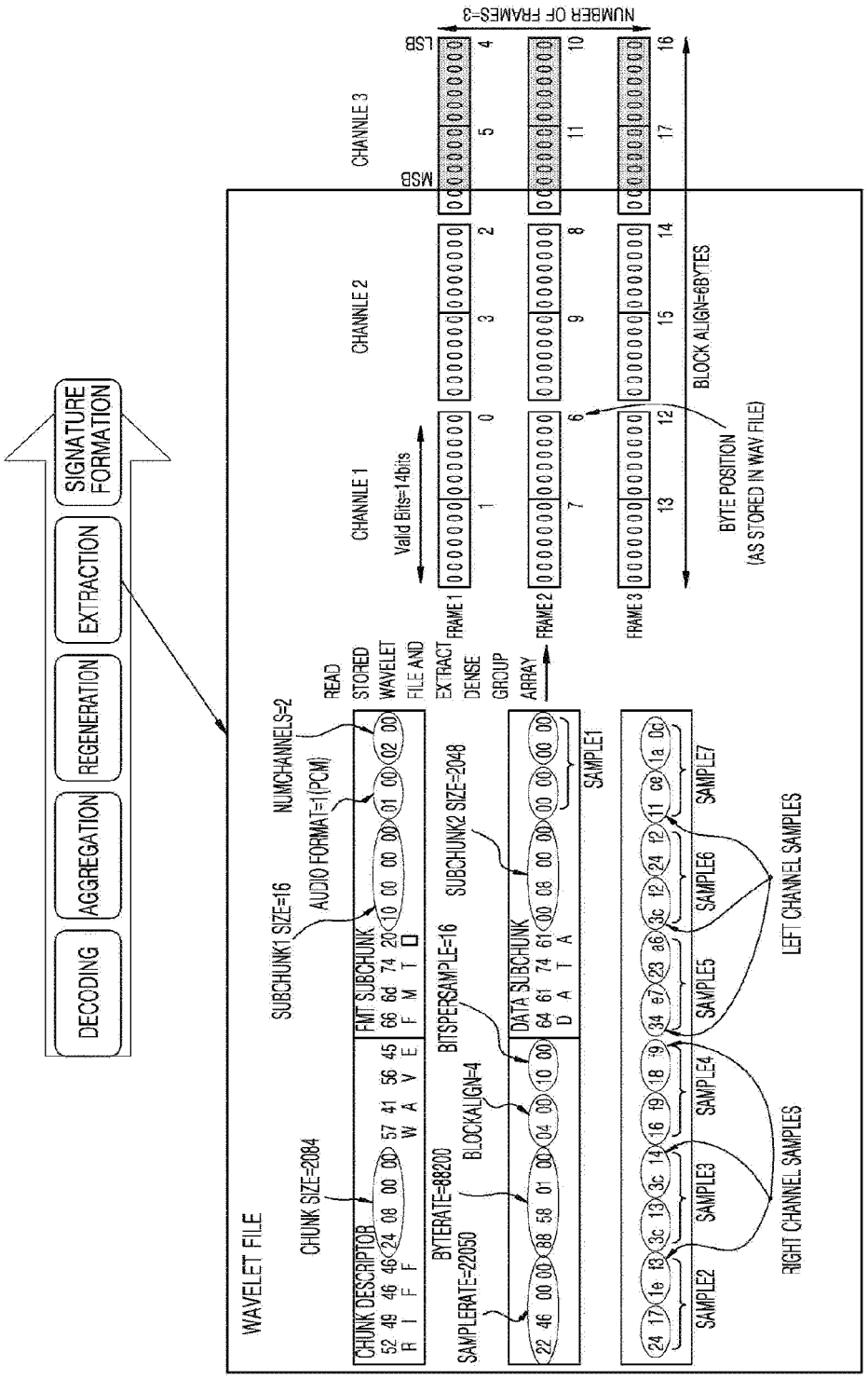

FIG. 7A and FIG. 7B are diagrams illustrating the extraction phase, according to an embodiment of the disclosure. The dense group array is extracted from the 4 KB wavelet file. The wavelet file is read and the hexadecimal code included in the dense group array is extracted as shown in FIG. 7A and FIG. 7B.

Figure 8A:
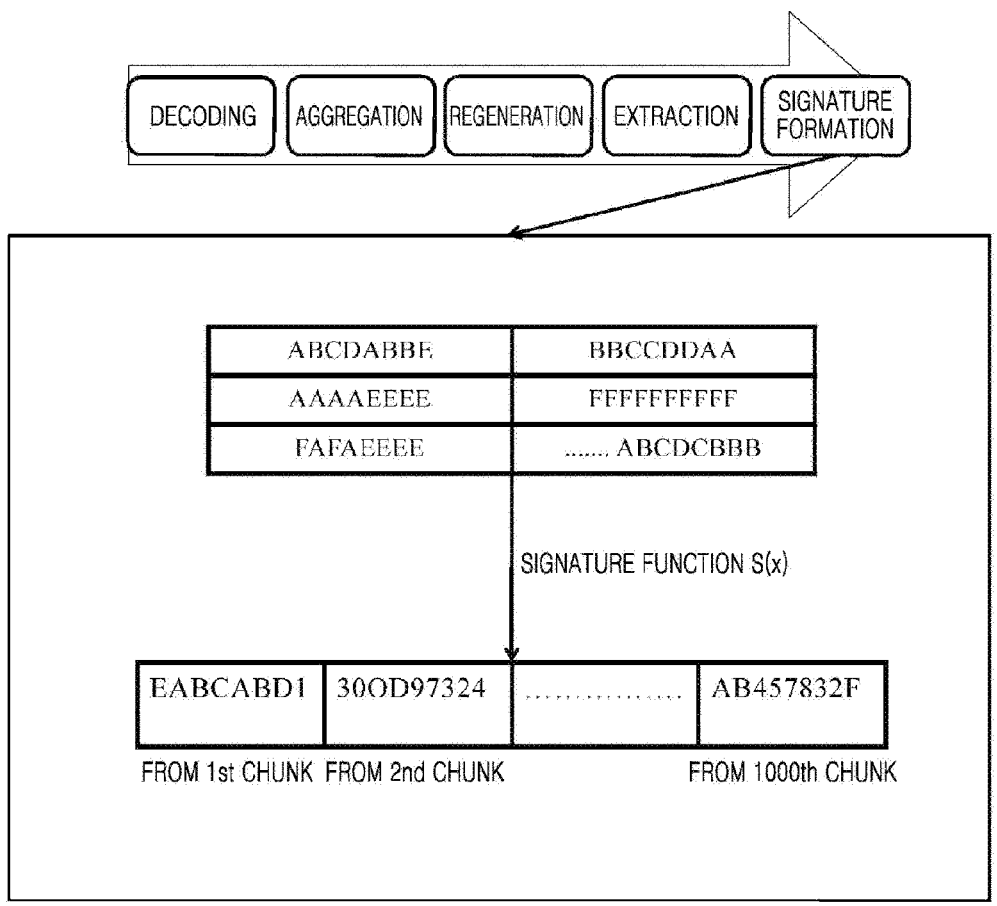
FIGS. 8A and 8B are diagrams illustrating the signature formation phase, according to an embodiment of the disclosure.
Figure 8B:
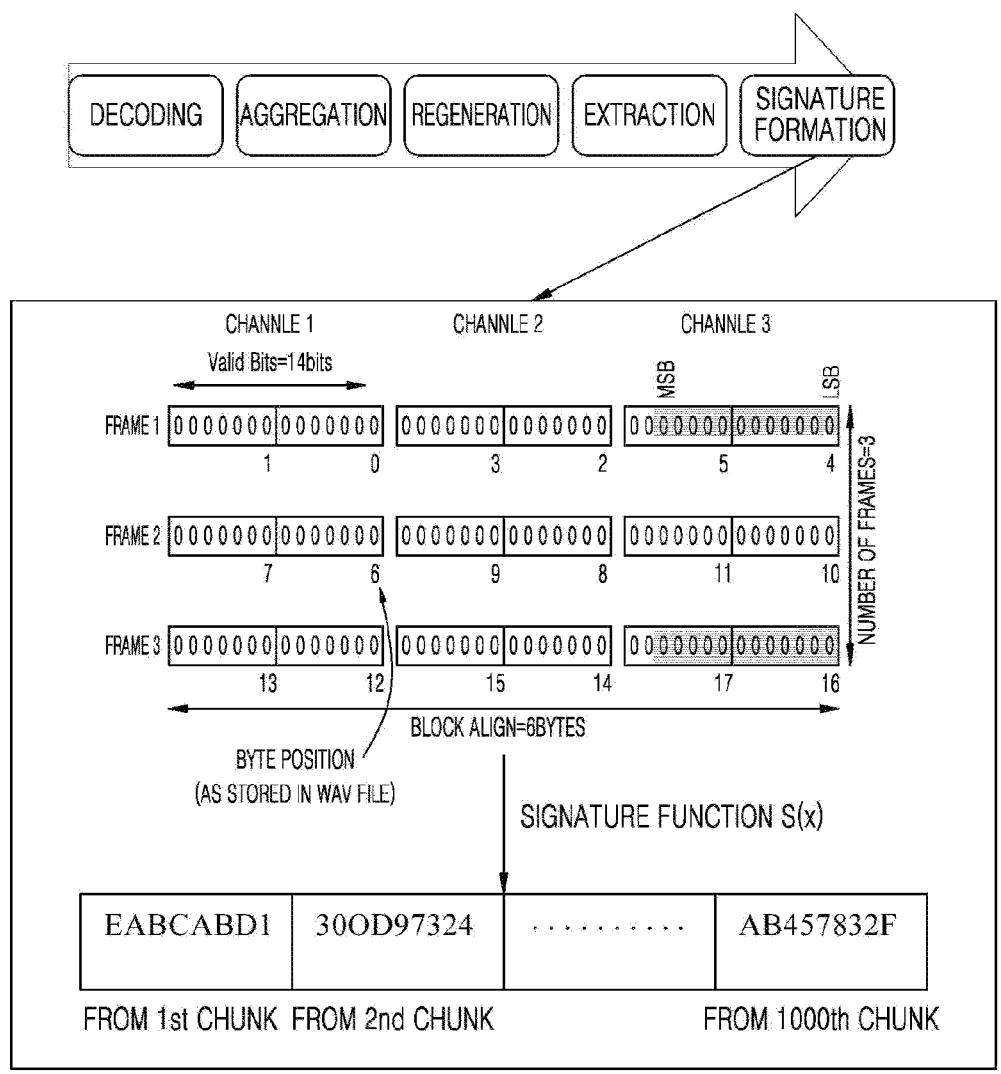

FIG. 8A and FIG. 8B are diagrams illustrating the signature formation phase, according to an embodiment of the disclosure. In an embodiment, from the extracted dense group array, the unique signature is generated using a polynomial signature function as follows:

$$S(x)=4x_1^3+3x_2^2+2x_3+x_4 \qquad \text{Equation (1)}$$

Referring back to FIG. 7A, the 4 bytes of the densest group array for the byte stream 1 has the hexadecimal code value of ABCDABBE and for the Equation (1) above, each byte from the MSB (most significant bit) will be assigned to $x_1$, $x_2$, $x_3$ and $x_4$, respectively. That is, $x_1$=AB, $x_2$=CD, $x_3$=AB and $x_4$=BE and the final result of S(X)=EABA will be a part of the final unique signature. The final unique signature may be obtained from 1,000 calculations of Equation (1) for each of the densest group array corresponding to each of the byte stream 1, 2, . . . , 1000.

In an embodiment, a different polynomial signature function other than Equation (1) may be used for obtaining the final unique signature.

The final result of the Equation (1) is the unique signature of the audio content. As described above, the variables $x_1$, $x_2$, $x_3$ and $x_4$ may be derived based on each 4 byte array of the 4 KByte dense group array. A hexadecimal code value is obtained corresponding to each 4 byte chunk and all the obtained hexadecimal code values are concatenated for a unique signature for the audio content.

Figure 9:
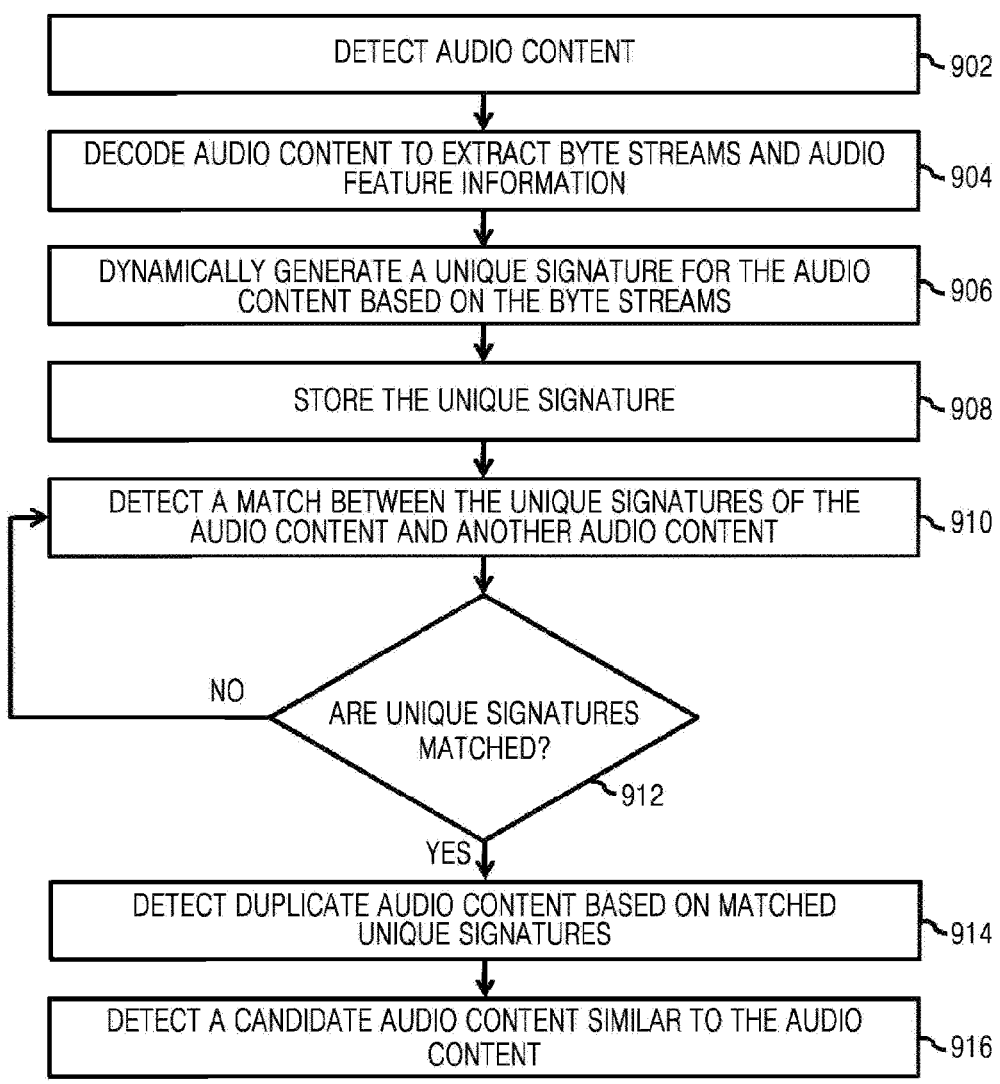
FIG. 9 is a flow diagram of detecting duplicate audio content based on unique signatures, according to an embodiment of the disclosure.

FIG. 9 is a flow diagram of detecting duplicate audio content based on unique signatures, according to an embodiment of the disclosure.

At step 902, the electronic device 100 may detect and/or receive audio content from various audio content sources 204A to 204N. In case that the audio content source is the electronic device 100, the electronic device may detect one of audio content from the memory 106 of the electronic device 100.

At step 904, the audio signature engine 102 decodes the audio content into a plurality of byte streams. Audio feature information may be also extracted based on the decoding.

At step 906, the audio signature engine 102 dynamically generates a unique signature for the audio content based on the byte streams. At step 908, the unique signature is stored in the memory 106.

At step 910, a comparison between the unique signatures corresponding to all the audio content in the electronic device 100 is performed. At step 912, the electronic device 100 determines whether there is any other unique signature matching the unique signature. Upon a successful match, duplicate audio content corresponding to the matching unique signature is detected at step 914. Further, any candidate audio content similar to the audio content in the electronic device 100 is detected based on a comparison of the unique signatures. In an embodiment, the detected duplicate audio content may be removed or deleted from the memory 106 for memory optimization.

Figure 10:
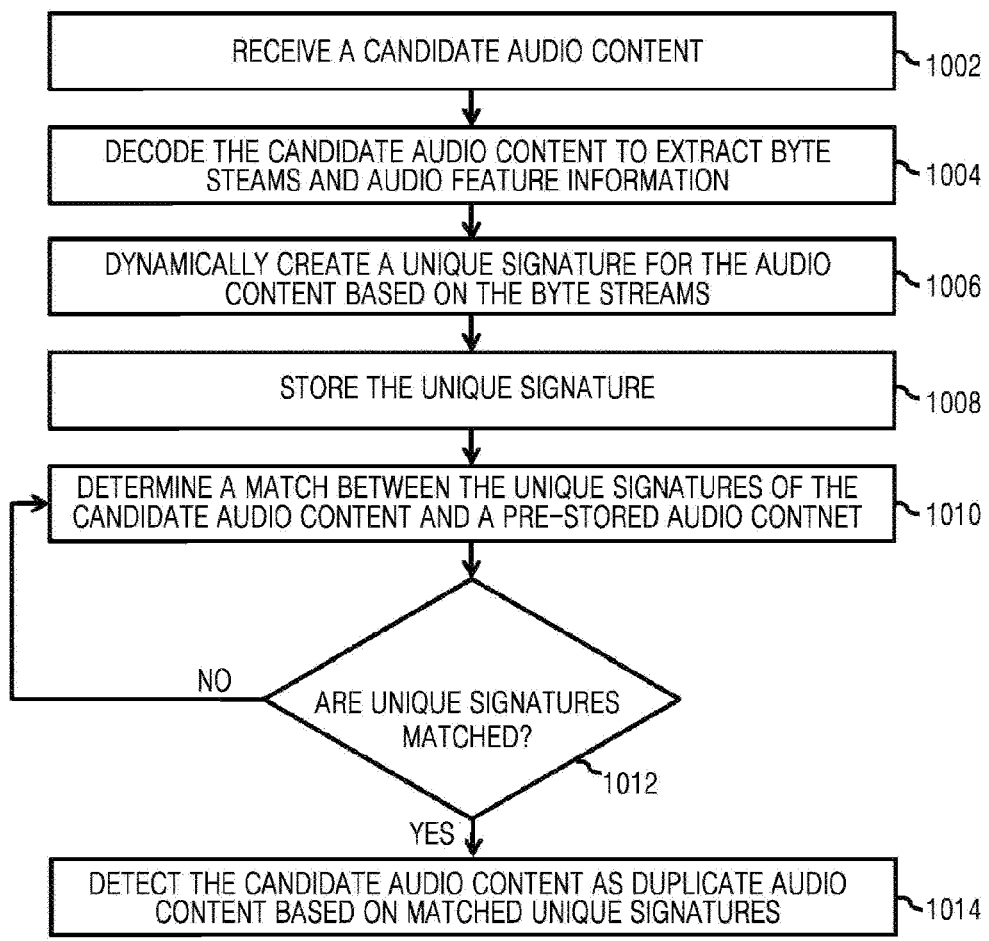
FIG. 10 is a flow diagram of detecting a candidate audio content as duplicate audio content based on unique signatures, according to an embodiment of the disclosure.

FIG. 10 is a flow diagram of detecting a candidate audio content as duplicate audio content based on matched unique signatures, according to an embodiment of the disclosure.

At step 1002, the electronic device 100 receives a candidate audio content from the audio content sources 204A to 204N. At step 1004, the audio signature engine 102 decodes the candidate audio content into a plurality of byte streams and audio feature information is also extracted. At step 1006, the audio signature engine 102 dynamically creates a unique signature for the candidate audio content based on the byte streams. At step 1008, the unique signature is stored in the memory 106. At step 1010 and 1012, a comparison between the unique signatures corresponding to all the audio content in the electronic device 100 and the unique signature of the candidate audio content is performed, and upon a successful match duplicate audio content is detected at step 1014.

Figure 11:
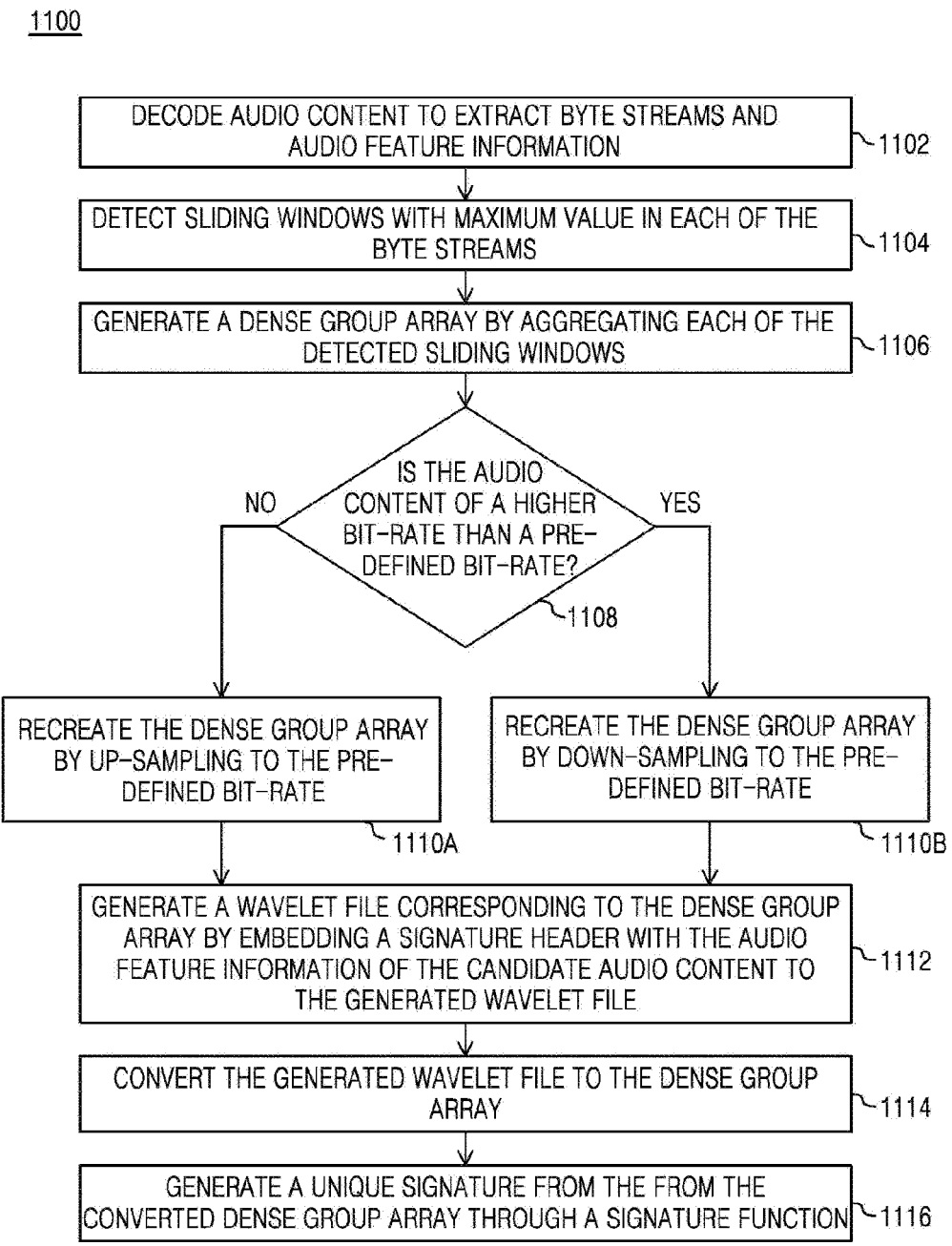
FIG. 11 is a flow diagram of generating a unique signature for audio content, according to an embodiment of the disclosure.

FIG. 11 is a flow diagram of generating a unique signature for audio content, according to an embodiment of the disclosure.

The audio content is decoded by the audio decoder 102A at step 1102 to extract byte steams and audio feature information. At step 1104, the dense array aggregator 102B (shown in FIG. 1) detects sliding windows with maximum value in each of the byte streams. The size of sliding windows may be determined as, for example, 3 bits in each of the byte stream. The sliding window may shift from the most significant bit (MSB) to the least significant bit (LSB) of each of the byte stream to detect the maximum value. The maximum value may be determined based on the number of bits having value '1' in the size of sliding window. If consecutive bits of '111' are detected when the sliding window shifts in a byte stream, the '111' may be determined as the maximum value. Further, at step 1106, the dense array aggregator 102B generates a dense group array by aggregating each of the detected sliding windows. Based on the bit rate of the audio content, the dense group array is recreated by the bit-rate normalizer 102C through up-sampling or down-sampling to a pre-defined bit-rate (steps 1110A and 1110B). The bit-rate normalizer 102C further generates the wavelet file corresponding to the dense group array by embedding a signature header containing the audio feature information of the candidate audio content into the recreated dense group array at step 1112.

Figure 12:
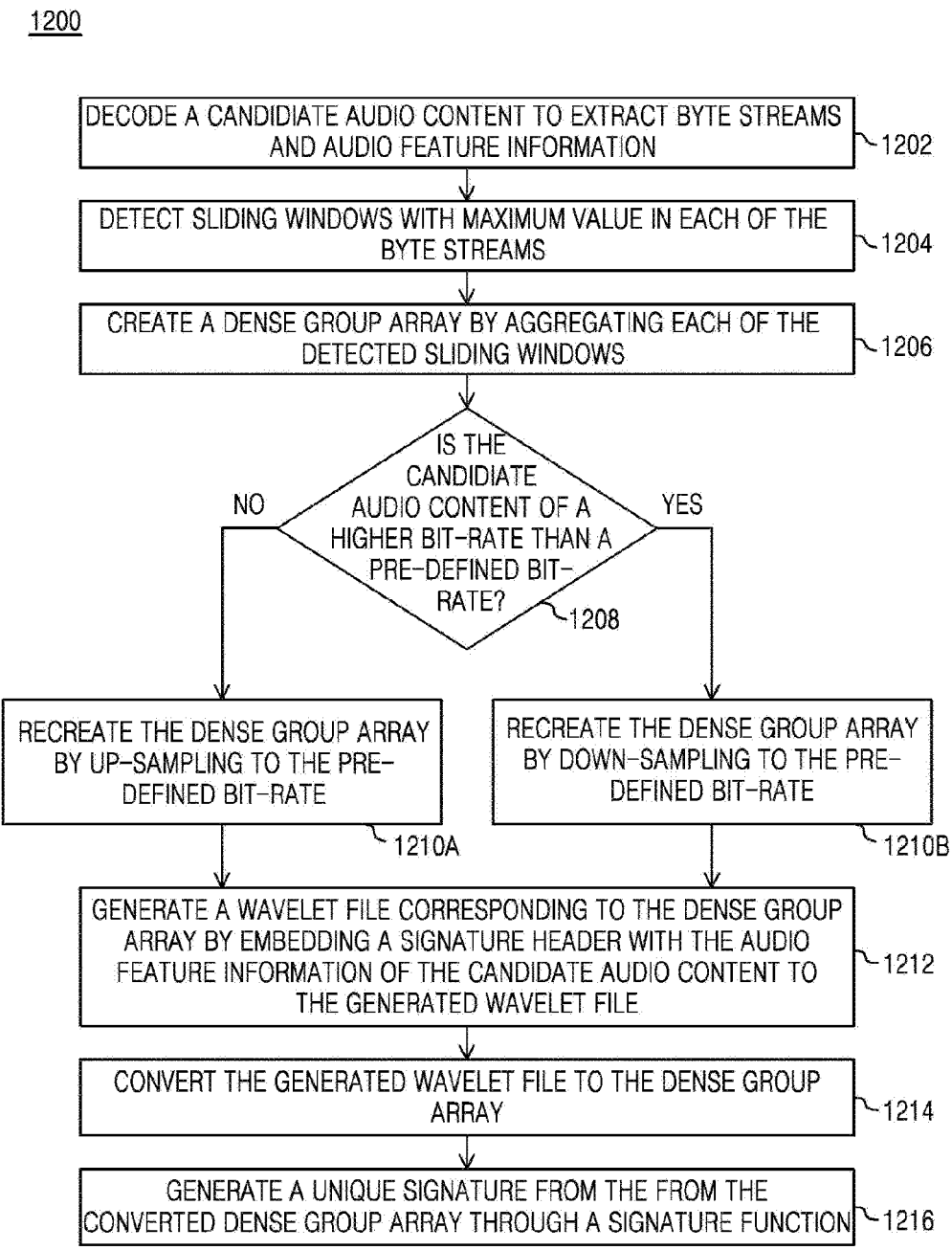
FIG. 12 is a flow diagram of generating a unique signature for a candidate audio content, according to an embodiment of the disclosure.
Figure 13:
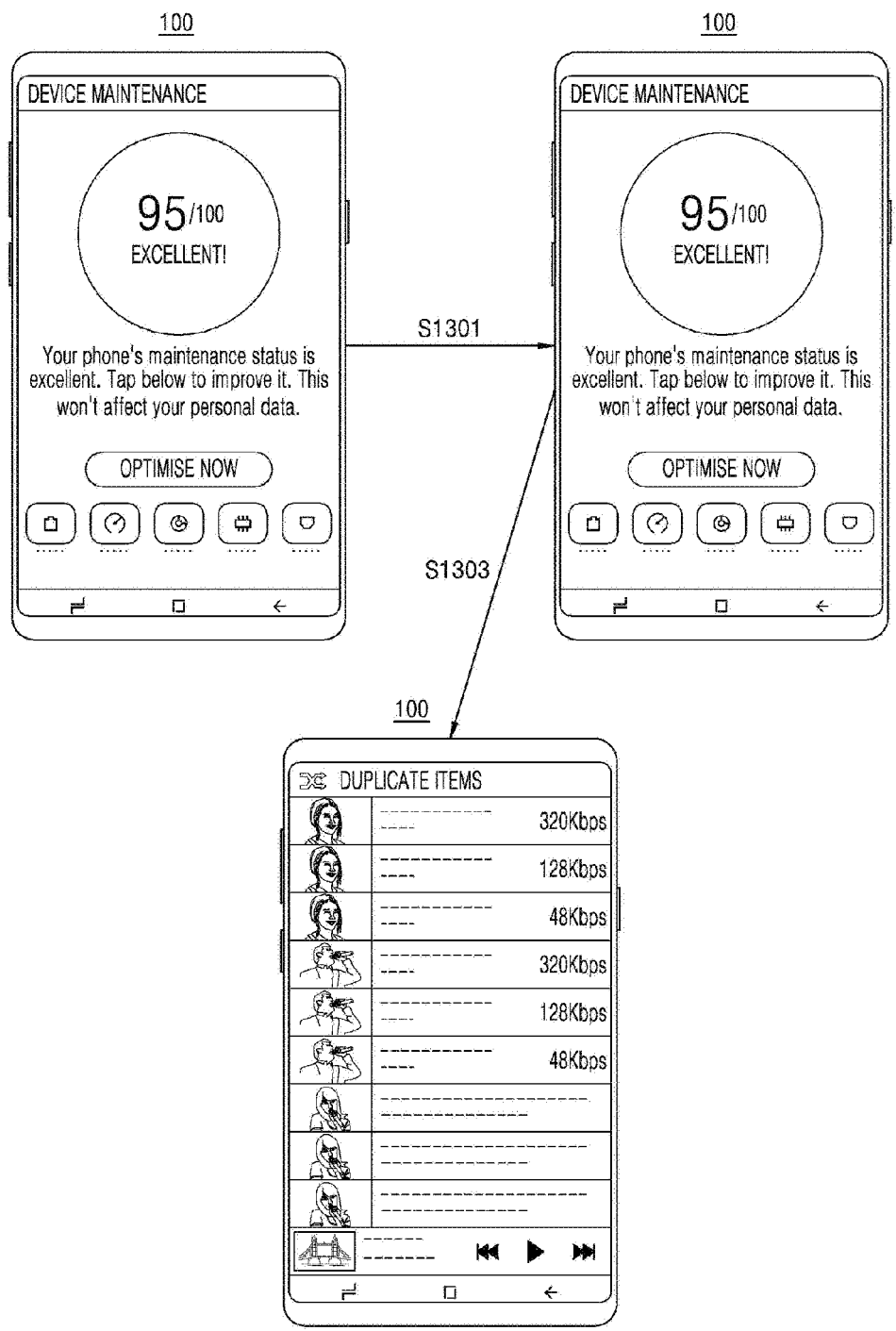
FIG. 13 is an example scenario illustrating a optimization of the memory in the electronic device 100 by removing the detected duplicate content, according to an embodiment of the disclosure.

The byte stream extractor 102D converts the generated wavelet file to the dense group array at step 1114. The signature generator 102E generates a unique signature from the converted dense group array through a polynomial signature function such as Equation (1) at step 1116. The unique signature is the same for all audio content among the plurality of audio content that are identical to each other irrespective of at least one of a format of the audio content and the bit-rate of the audio content FIG. 12 is a flow diagram of generating a unique signature for a candidate audio content, according to an embodiment as disclosed herein. The candidate audio content is decoded by the audio decoder 102A at step 1202 to extract byte steams and audio feature information. At step 1204, the dense array aggregator 102B (shown in FIG. 1) detects sliding windows with maximum value in each of the byte streams. Further at step 1206, the dense array aggregator 102B generates a dense group array by aggregating each of the detected sliding windows with maximum value. Based on the bit-rate of the audio content, the dense group array is recreated by the bit-rate normalizer 102C through up-sampling or down-sampling to a pre-defined bit-rate (Steps 1210A and 1210B). The bit-rate normalizer 102C further generates the wavelet file corresponding to the dense group array by embedding a signature header containing the audio feature information of the candidate audio content into the recreated dense group array at step 1212. The byte stream extractor 102D converts the generated wavelet file to the dense group array at step 1214. The signature generator 102E generates a unique signature from the converted dense group array through Equation (1) at step 1216. The unique signature is the same for candidate audio content and any audio content of the plurality of audio content that are identical to each other irrespective of a format of the audio content, a format of the candidate audio content, the bit-rate of the audio content and/or the bit-rate of the candidate audio content FIG. 13 is an example scenario illustrating an optimization of the memory in the electronic device 100 by removing the detected duplicate content, according to an embodiment of the disclosure. The duplicate content may be identified based on the method described referring to FIG. 9, FIG. 10, FIG. 11 and/or FIG. 12.

Referring to FIG. 13, a user of the electronic device 100 may attempt to optimize the memory at step S1301 and at step S1303, the electronic device 100 may display, for memory management and optimization, duplicate contents on a display based on the method described referring to FIG. 9, FIG. 10, FIG. 11 or FIG. 12.

Figure 14:
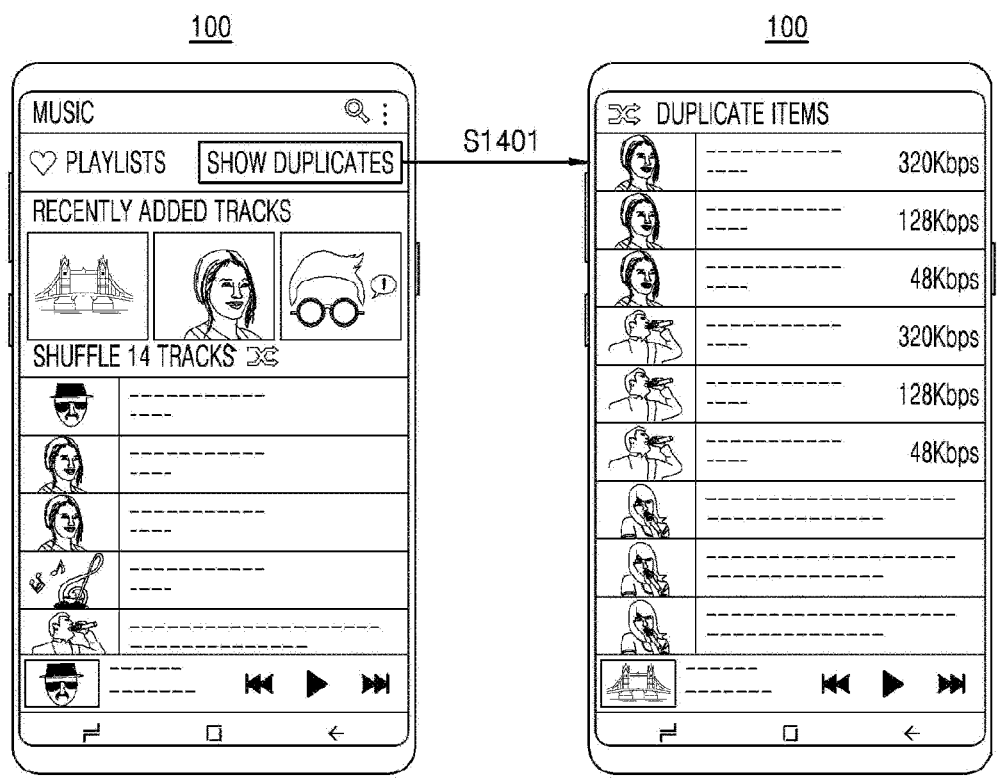
FIG. 14 is an example scenario of detecting and displaying duplicate audio content, according to an embodiment of the disclosure.

FIG. 14 is an example scenario of detecting and displaying duplicate audio content, according to an embodiment of the disclosure.

Referring to FIG. 14, if the user touches "SHOW DUPLICATE" on a display displaying a list of audio contents at step S1401, the electronic device may display a plurality of duplicate contents on the display of the electronic device based on the process illustrated referring to FIG. 9, FIG. 10, FIG. 11 or FIG. 12.

Figure 15:
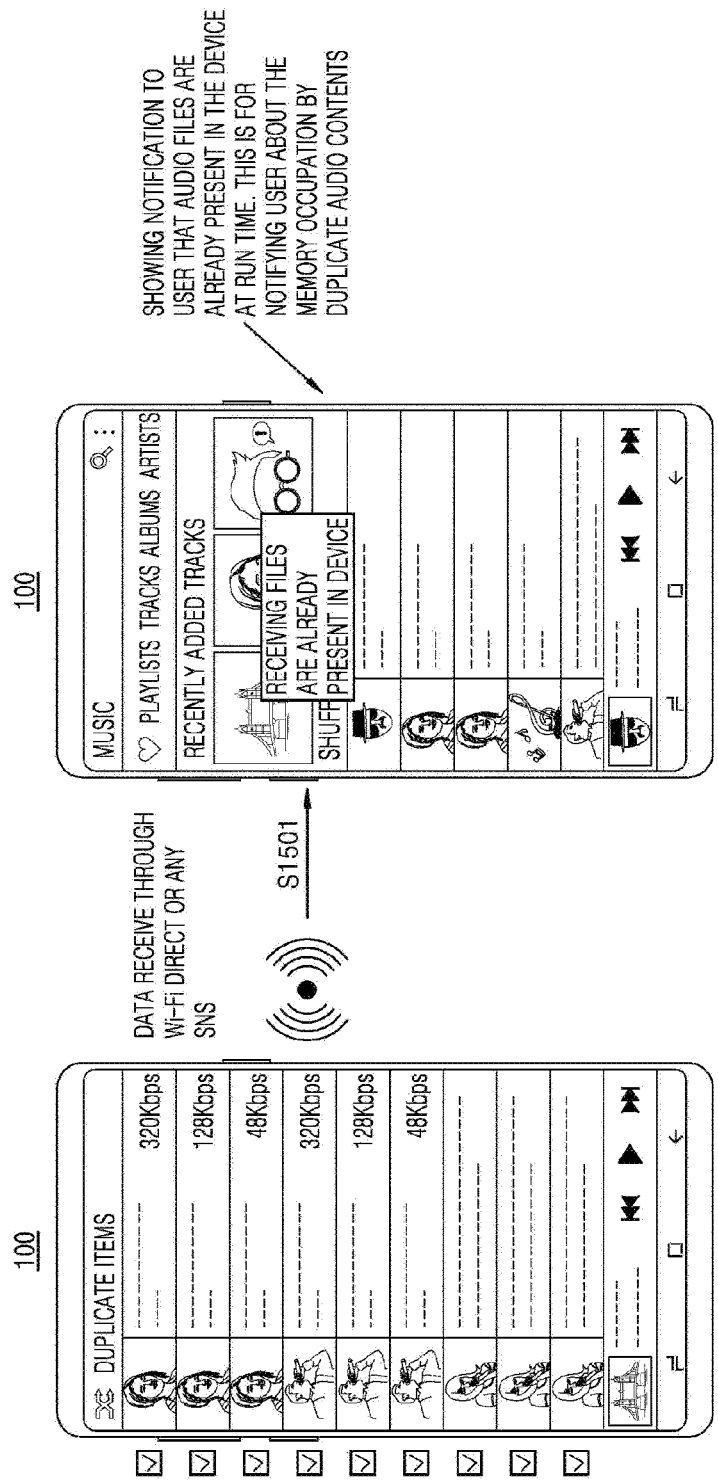
FIG. 15 is an example scenario of detecting received candidate audio content as duplicate audio content in the electronic device 100, according to an embodiment of the disclosure.

FIG. 15 is an example scenario of detecting received candidate audio content as duplicate audio content in the electronic device 100, according to an embodiment of the disclosure.

Figure 16:
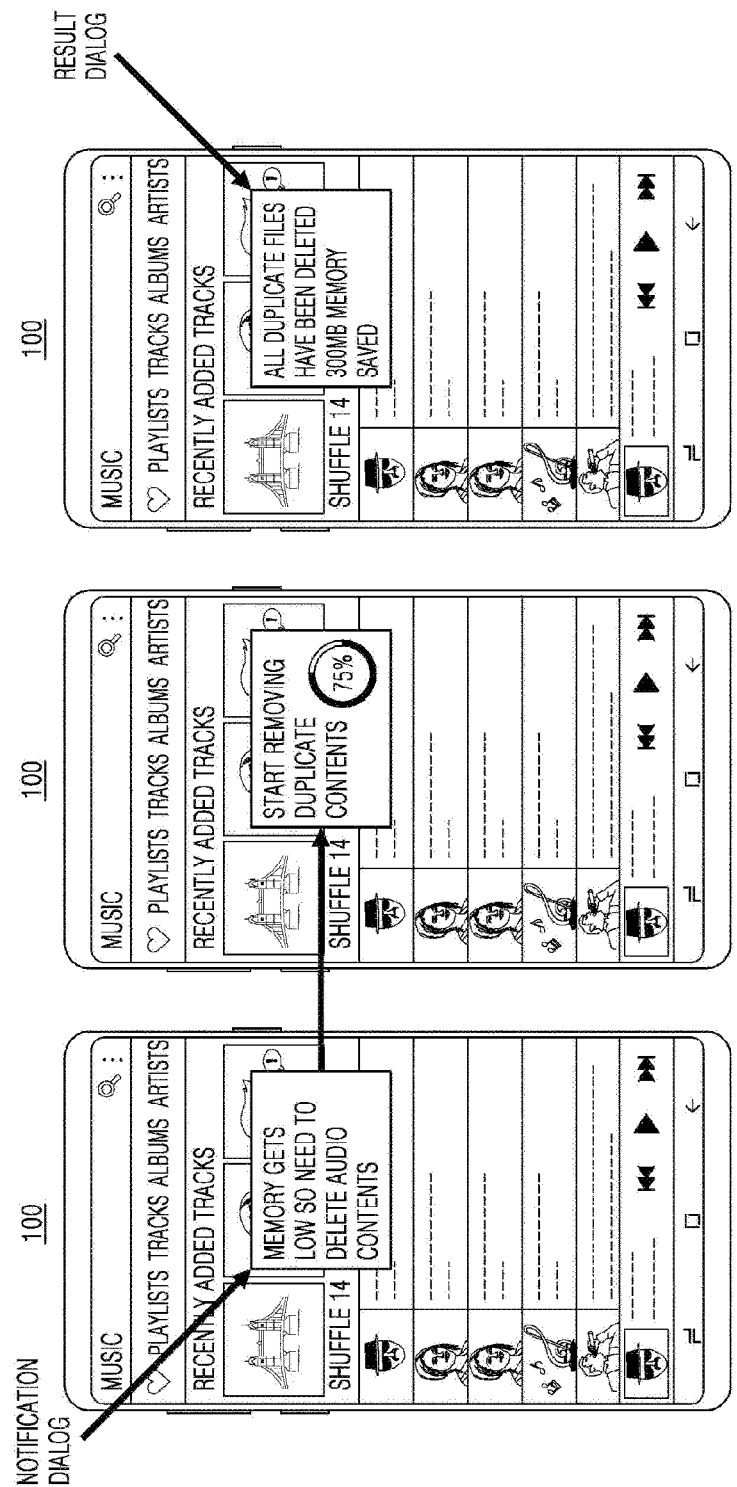
FIG. 16 is an example scenario of detecting low memory status and removing duplicate audio content in the electronic device, according to an embodiment of the disclosure.

FIG. 16 is an example scenario of detecting low memory status and automatically removing duplicate audio content in the electronic device 100, according to an embodiment of the disclosure.

Figure 17:
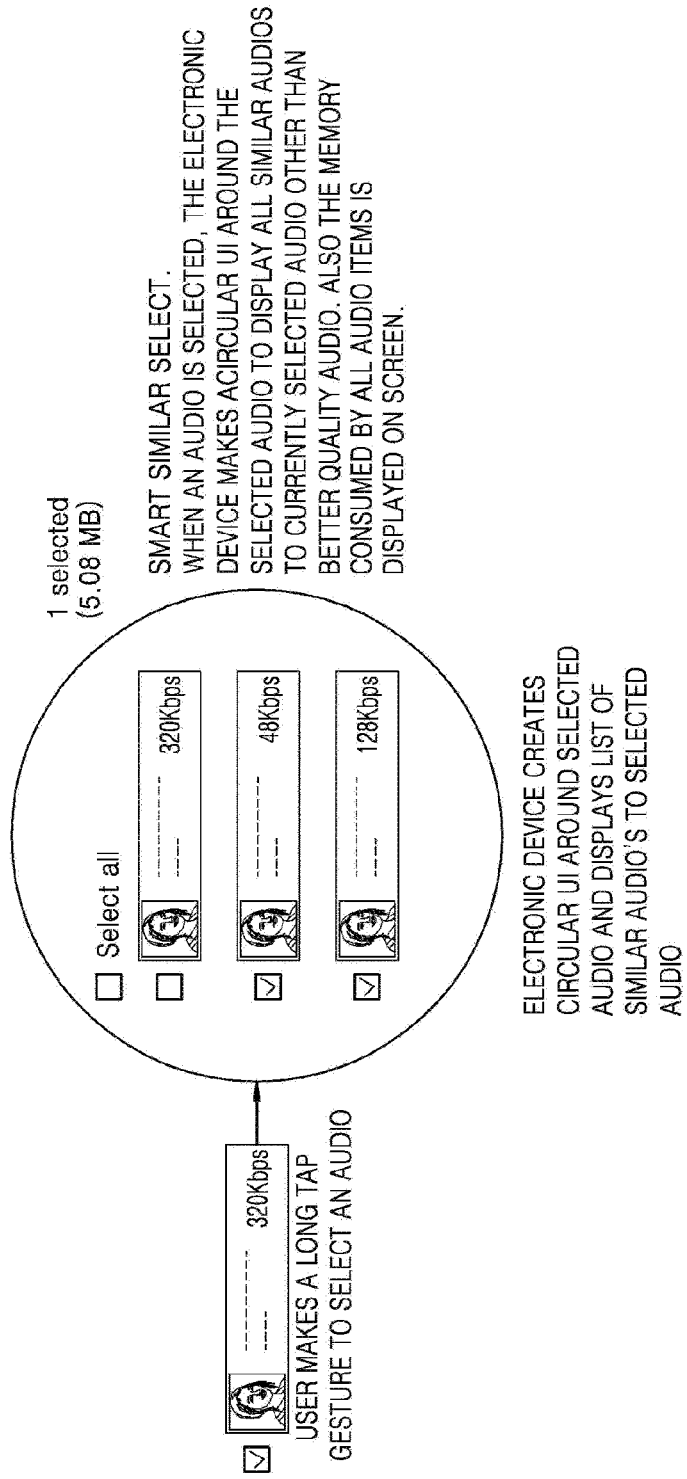
FIG. 17 is an example scenario illustrating displaying audio content similar to the audio content selected through a user gesture on the electronic device, according to an embodiment of the disclosure.

FIG. 17 is an example scenario of displaying audio content similar to the audio content selected through a user gesture on the electronic device 100, according to an embodiment of the disclosure.

Figure 18:
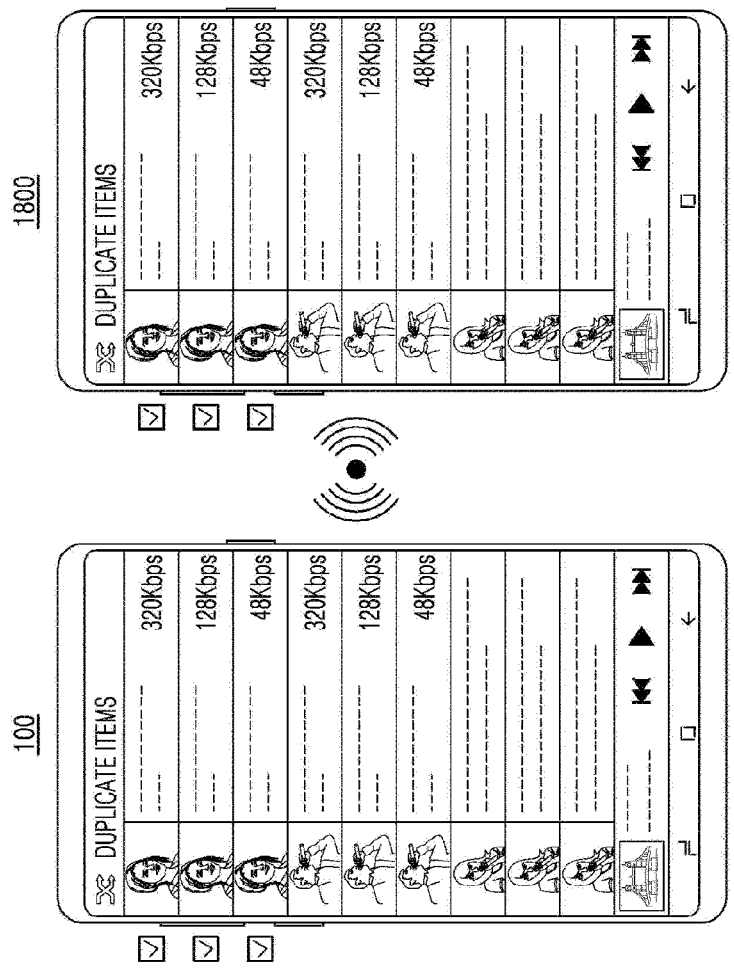
FIG. 18 is an example scenario illustrating detecting duplicate audio content in a memory storage shared between multiple electronic devices, according to an embodiment of the disclosure.

FIG. 18 is an example scenario of detecting duplicate audio content in the memory shared between multiple electronic devices 100 and 1800, according to an embodiment of the disclosure.

Accordingly, embodiments disclosed herein provide a method for detecting duplicate audio content in an electronic device. The method includes receiving, by the electronic device, a plurality of audio content. The method further includes decoding, by the electronic device, each of the audio content to extract a plurality of byte streams of each of the audio content and audio feature information of each of the audio content. The method further includes dynamically creating, by the electronic device, a unique signature for each of the audio content based on the plurality of byte streams of each of the audio content, and storing, by the electronic device, the unique signature of each of the audio content in the electronic device to identify duplicate audio content.

In an embodiment, the method further includes determining, a match between the unique signatures of the plurality of audio content and detecting duplicate audio content among the plurality of audio content if a match is determined.

In an embodiment, the method further includes receiving, by the electronic device, a candidate audio content, decoding, by the electronic device, the candidate audio content to extract a plurality of byte streams of the candidate audio content and audio feature information of the candidate audio content and dynamically creating, by the electronic device, a unique signature based on the plurality of byte streams of the candidate audio content. The method further includes determining a match between the signature of the candidate audio content and each of the stored unique signatures of each of the plurality of audio content and detecting, by the electronic device, the candidate audio content as duplicate audio content if the match is determined or storing the unique signature of the candidate audio content in the electronic device if no match is determined.

In an embodiment, dynamically creating a unique signature based on the plurality of byte streams for the candidate audio content comprises detecting at least one sliding window with maximum value in each of the plurality of byte streams, wherein the at least one sliding window is of a pre-defined memory size, creating a dense group array by aggregating each of the detected at least one sliding windows corresponding to each of the plurality of byte streams, recreating the dense group array by one of up-sampling or down-sampling the dense group array to a pre-defined bit rate, generating a wavelet file corresponding to the dense group array by embedding a signature header with the audio feature information of the candidate audio content to the recreated dense group array, converting the generated wavelet file to the dense group array and generating the unique signature from the converted dense group array through a signature function.

In an embodiment, the audio feature information of the candidate audio content comprises at least one of a sample rate of the candidate audio content, a channel count of the candidate audio content, a duration of the candidate audio content, a bit rate of the candidate audio content and the bit depth of the candidate audio content.

In an embodiment, the dense group array comprises the most relevant information of the candidate audio content.

In an embodiment, the signature function is a polynomial function.

In an embodiment, the unique signature is stored in a database as a key for identifying the candidate audio content. Further, the unique signature is the same for candidate audio content and any audio content of the plurality of audio content that are identical to each other irrespective of at least one of a format of the audio content, a format of the candidate audio content, the bit-rate of the audio content and the bit-rate of the candidate audio content.

In an embodiment, dynamically creating a unique signature for each of the audio content based on the plurality of byte streams of each of the audio content comprises detecting at least one sliding window with maximum value in each of the plurality of byte streams, wherein the at least one sliding window is of a pre-defined memory size, creating a dense group array by aggregating each of the detected at least one sliding windows corresponding to each of the plurality of byte streams, recreating the dense group array by one of up-sampling or down-sampling the dense group array to a pre-defined bit rate, generating a wavelet file corresponding to the dense group array by embedding a signature header with the audio feature information of the candidate audio content to the recreated dense group array, converting the generated wavelet file to the dense group array and generating the unique signature from the converted dense group array through a signature function.

Accordingly, embodiments disclosed herein provide an electronic device for detecting duplicate audio content. The electronic device includes a memory, a processor and an audio signature engine communicably coupled to the processor and the memory. The audio signature engine is configured for receiving a plurality of audio content, decoding each of the audio content to extract a plurality of byte streams of each of the audio content and audio feature information of each of the audio content, dynamically creating a unique signature for each of the audio content based on the plurality of byte streams of each of the audio content and storing the unique signature of each of the audio content in the memory to identify duplicate audio content.

Although the content is described with audio content, the disclosure is not limited to audio content but the disclosure may be extended to any kind of content such as video content, image content, text content, etc.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method of detecting duplicate content in an electronic device, the method comprising:
    detecting content from at least one content source;
    decoding the content to generate a plurality of byte streams and extract feature information from the content;
    generating a densest group array corresponding to each byte stream of the plurality of byte streams by reducing a size of each byte stream;
    generating a unique signature for the content based on the densest group array corresponding to each byte stream; and
    detecting duplicate audio content based on a matching unique signature by comparing the unique signature with unique signatures corresponding to other contents stored in the electronic device,
    wherein the generating of the densest group array corresponding to each byte stream comprises:
        determining a size of sliding window covering a number of bits consecutively in each byte stream;
        detecting a sliding window with maximum number of bits having a value of 1 consecutively for each byte stream, respectively;
        aggregating the sliding window with the maximum number of bits having a value of 1 consecutively for each byte stream; and
        generating the densest group array corresponding to each byte stream based on the aggregation.

2. The method of claim 1, further comprising:
    deleting the duplicate audio content from the electronic device.

3. The method of claim 1, further comprising:
    generating a data file by combining the densest group array corresponding to each byte stream and a header comprising the feature information.

4. The method of claim 1, wherein the generating of the unique signature for the content comprises:
    obtaining the unique signature by calculating a predetermined signature function with values of the densest group array.

5. The method of claim 1, wherein the feature information comprises at least one of a data size of the content, a sample rate of the content, a channel count of the content, content format, duration for reproducing the content, a bit rate of the content or a bit depth of the content.

6. The method of claim 1, wherein the detecting of the content from the at least one content source comprises:
    detecting content received from a network,
    wherein the at least one content source is at least one node connected to the network outside the electronic device.

7. The method of claim 1, further comprising:
    shifting a sliding window from a most significant bit to a least significant bit of each byte stream for detecting the sliding window having the maximum number of bits having a value of 1 consecutively for each byte stream.

8. The method of claim 1, further comprising: performing a down-sampling or an up-sampling of the other contents stored in the electronic device to match a sampling rate between the content and the other contents stored in the electronic device before comparing the unique signature with unique signatures corresponding to the other contents stored in the electronic device.

9. An apparatus for detecting duplicate content, the apparatus comprising:
    a memory; and
    a processor configured to:
    detect content from at least one content source;
    decode the content to generate a plurality of byte streams and extract feature information from the content;
    generate a densest group array corresponding to each byte stream of the plurality of byte streams by reducing a size of each byte stream, wherein the processor is further configured to:
        determine a size of sliding window covering a number of bits consecutively in each byte stream;
        detect a sliding window with maximum number of bits having a value of 1 consecutively for each byte stream, respectively;
        aggregate the sliding window with the maximum number of bits having a value of 1 consecutively for each byte stream; and
        generate the densest group array corresponding to each byte stream based on the aggregation;
    generate a unique signature for the content based on the densest group array corresponding to each byte stream; and
    detect duplicate audio content based on a matching unique signature by comparing the unique signature with unique signatures corresponding to other contents stored in the memory.

10. The apparatus of claim 9, wherein the generating of the unique signature for the content comprises: obtaining the unique signature by calculating a predetermined signature function with values of the densest group array.

11. The apparatus of claim 9, wherein the processor is configured to shift a sliding window from a most significant bit to a least significant bit of each byte stream for detecting the sliding window with the maximum number of bits having a value of 1 consecutively for each byte stream.

12. A non-transitory computer readable medium configured to store one or more computer programs including instructions that, when executed by at least one processor, cause the at least one processor to control for:
    detecting content from at least one content source;
    decoding the content to generate a plurality of byte streams and extract feature information from the content;
    generating a densest group array corresponding to each byte stream of the plurality of byte streams by reducing a size of each byte stream;
    generating a unique signature for the content based on the densest group array corresponding to each byte stream; and
    detecting duplicate audio content based on a matching unique signature by comparing the unique signature with unique signatures corresponding to other contents stored in an electronic device,
    wherein the generating of the densest group array corresponding to each byte stream comprises:
        determining a size of sliding window covering a number of bits consecutively in each byte stream;
        detecting a sliding window with maximum number of bits having a value of 1 consecutively for each byte stream, respectively;
        aggregating the sliding window with the maximum number of bits having a value of 1 consecutively for each byte stream; and generating the densest group array corresponding to each byte stream based on the aggregation.

\* \* \* \* \*